US012029986B2

(12) United States Patent
Kawahara

(10) Patent No.: US 12,029,986 B2
(45) Date of Patent: Jul. 9, 2024

(54) NON-TRANSITORY COMPUTER-READABLE RECORDING MEDIUM AND METHOD FOR CONTROLLING COMMUNICATION BETWEEN A SERVER DEVICE AND A TERMINAL DEVICE

(71) Applicant: GREE, INC., Tokyo (JP)

(72) Inventor: Hiroshi Kawahara, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 18/360,718

(22) Filed: Jul. 27, 2023

(65) Prior Publication Data

US 2023/0364518 A1 Nov. 16, 2023

Related U.S. Application Data

(63) Continuation of application No. 17/564,409, filed on Dec. 29, 2021, now Pat. No. 11,712,632, which is a
(Continued)

(30) Foreign Application Priority Data

Mar. 16, 2017 (JP) ................................. 2017-051442

(51) Int. Cl.
*A63F 13/35* (2014.01)
*A63F 13/795* (2014.01)
(Continued)

(52) U.S. Cl.
CPC ............ *A63F 13/798* (2014.09); *A63F 13/35* (2014.09); *A63F 13/795* (2014.09); *A63F 13/06* (2013.01);
(Continued)

(58) Field of Classification Search
CPC ........ A63F 13/798; A63F 13/35; A63F 13/46; A63F 13/795; A63F 2300/558; A63F 2300/61
See application file for complete search history.

(56) References Cited

U.S. PATENT DOCUMENTS 6,623,360 B1  9/2003  Nakajima
6,839,435 B1  1/2005  Iijima
(Continued)

FOREIGN PATENT DOCUMENTS

JP  2006-192142 A  7/2006
JP  2009-189593 A  8/2009
(Continued)

OTHER PUBLICATIONS

Office Action issued Aug. 1, 2017 in Japanese Priority Application No. 2017-051442 with English Translation.
(Continued)

*Primary Examiner* — David L Lewis
*Assistant Examiner* — Shauna-Kay N. Hall
(74) *Attorney, Agent, or Firm* — Oblon, McClelland, Maier & Neustadt, L.L.P.

(57) ABSTRACT

A non-transitory computer-readable recording medium containing a program, which, when executed by processing circuitry of a terminal device that communicates with a server device, causes the processing circuitry to: execute a game part, the server device being for storing ranking information including a plurality of first points each corresponding to each of a plurality of user groups to each of which one or more users belong, the ranking information also including a rank of each user group determined based on the corresponding first point; in response to an execution result of the game part satisfying a first condition, transmit, to the server device, a request for changing the first point
(Continued)

corresponding to a first user group among the user groups to which the user of the terminal device belongs; and receive, from the server device, the ranking information updated based on the first point after being changed.

20 Claims, 15 Drawing Sheets

Related U.S. Application Data continuation of application No. 17/039,721, filed on Sep. 30, 2020, now Pat. No. 11,247,132, which is a continuation of application No. 15/908,551, filed on Feb. 28, 2018, now Pat. No. 10,821,365.

(51) Int. Cl.
*A63F 13/798* (2014.01)
*A63F 13/20* (2014.01)

(52) U.S. Cl.
CPC ..... *A63F 2300/558* (2013.01); *A63F 2300/61* (2013.01)

(56) References Cited

U.S. PATENT DOCUMENTS

| | | |
|---|---|---|
| 6,986,712 B1 | 1/2006 | Ogawa |
| 2002/0115488 A1 | 8/2002 | Berry |
| 2007/0156267 A1 | 7/2007 | Nozaki |
| 2007/0191105 A1 | 8/2007 | Azuma |
| 2009/0036214 A1 | 2/2009 | Dahl |
| 2009/0209334 A1 | 8/2009 | Umaki et al. |
| 2010/0261536 A1 | 10/2010 | Shibamiya |
| 2011/0124417 A1 | 5/2011 | Baynes |
| 2012/0323348 A1 | 12/2012 | Joo et al. |
| 2015/0065247 A1 | 3/2015 | Joo |
| 2015/0231496 A1 | 8/2015 | Yang et al. |
| 2018/0264366 A1 | 9/2018 | Kawahara |
| 2019/0201793 A1 | 7/2019 | Kurabayashi |

FOREIGN PATENT DOCUMENTS

| | | |
|---|---|---|
| JP | 2013-000587 A | 1/2013 |
| JP | 2013-138750 A | 7/2013 |
| JP | 5477929 B | 4/2014 |
| JP | 2015-150270 A | 8/2015 |
| JP | 5951150 B1 | 7/2016 |
| JP | 2016-202550 A | 12/2016 |
| JP | 2017-035451 A | 2/2017 |
| JP | 2018-153341 A | 10/2018 |

OTHER PUBLICATIONS

Japanese Office Action issued on Jun. 18, 2019, in Patent Application No. 2018-028542, 9 pages (with English translation).

"Oreka is on counting, karma—a blog for just talking about what I like—", Retrieved from the internet: https://blogs.yahoo.co.jp/ar_ms_3_62need/36705960.html, Feb. 13, 2017, 3 pages (with English translation).

"Native social game 'Crash Fever': 'Ranking quest' is newly added! 6-star grade units are now released! Get rewards to aim the top ranking!," United Corporation, press release, Retrieved from the internet: https://united.jp/news/release/game/20160420cfrq.html, Apr. 20, 2016, 6 pages (with English translation).

"Guild; Dragon Quest Monster Parade, Square Enix Co., Ltd.," Retrieved from the internet: https://web.archive.org/web/20131213132744/https://www.dqmp.jp/help/guild.php, Dec. 13, 2013, 5 pages (with English translation).

Japanese Office Action issued on Sep. 26, 2023 in Japanese Patent Application No. 2022-186330 (with unedited computer-generated English translation), 7 pages.

Fig.2

| USER ID | USER NAME | INFORMATION RELATING TO GAME CONTENT |
|---|---|---|
| USER 001 | *** | *** |
| USER 002 | *** | *** |
| ... | ... | ... |

Fig.3

| USER GROUP ID | USER GROUP NAME | MEMBER INFORMATION | | |
|---|---|---|---|---|
| | | USER ID | USER ID | ... |
| GROUP 001 | *** | USER 001 | USER 002 | ... |
| GROUP 002 | *** | USER 011 | – | ... |
| ... | ... | ... | ... | ... |

Fig.4

| GAME PART ID | GAME PART NAME | GAME DATA | COMPUTATION PERIOD | GROUP SET INFORMATION | | |
|---|---|---|---|---|---|---|
| | | | | SET ID | USER GROUP ID | USER GROUP ID |
| PART 001 | *** | *** | 2016/07/22~2016/07/28 | SET 001 | GROUP 001 | GROUP 002 |
| | | | | SET 002 | GROUP 201 | GROUP 202 |
| PART 002 | *** | *** | 2016/07/29~2016/08/04 | SET 001 | GROUP 202 | GROUP 001 |
| | | | | SET 002 | GROUP 002 | GROUP 201 |
| ⋮ | ⋮ | ⋮ | ⋮ | ⋮ | ⋮ | ⋮ |

Fig.5

| GAME PART ID | SET ID | RANKING INFORMATION | | | | |
|---|---|---|---|---|---|---|
| | | USER GROUP ID | FIRST POINT | RANK ORDER | USER ID | SECOND POINT |
| PART 001 | SET 001 | GROUP 001 | 27500 | 1 | USER 001 | 5000 |
| | | | | | USER 002 | 2500 |
| | | | | ... | ... | ... |
| | | GROUP 100 | 15000 | 2 | USER 101 | 4000 |
| | | | | | USER 102 | 2000 |
| | | ... | ... | ... | ... | ... |
| | | GROUP 002 | — | 100 | — | — |

Fig.6

| USER GROUP ID | PATTERN | 1ST COLUMN {GAME CONTENT ID, COUNT} | 2ND COLUMN {GAME CONTENT ID, COUNT} | ... | 8TH COLUMN {GAME CONTENT ID, COUNT} | 9TH COLUMN {GAME CONTENT ID, COUNT} |
|---|---|---|---|---|---|---|
| GROUP 001 | 1 | {GAME CONTENT 001,1} | {GAME CONTENT 002,1} | ... | {GAME CONTENT 008,1} | {GAME CONTENT 009,10} |
| | 2 | {GAME CONTENT 011,1} | {GAME CONTENT 012,3} | ... | {GAME CONTENT 018,1} | {GAME CONTENT 019,10} |
| | ... | ... | ... | ... | ... | ... |
| | 8 | {GAME CONTENT 071,2} | {GAME CONTENT 072,1} | ... | {GAME CONTENT 078,3} | {GAME CONTENT 079,10} |
| | 9 | {GAME CONTENT 081,10} | {GAME CONTENT 082,10} | ... | {GAME CONTENT 088,10} | {GAME CONTENT 089,10} |

Fig.7

| USER ID | USER GROUP ID | PATTERN | 1ST COLUMN {GAME CONTENT ID, REMAINING COUNT} | 2ND COLUMN {GAME CONTENT ID, REMAINING COUNT} | ... | 8TH COLUMN {GAME CONTENT ID, REMAINING COUNT} |
|---|---|---|---|---|---|---|
| USER 001 | GROUP 001 | 1 | {GAME CONTENT 001,1} | {GAME CONTENT 002,0} | ... | {GAME CONTENT 008,5} |

NON-TRANSITORY COMPUTER-READABLE RECORDING MEDIUM AND METHOD FOR CONTROLLING COMMUNICATION BETWEEN A SERVER DEVICE AND A TERMINAL DEVICE

CROSS-REFERENCE TO RELATED APPLICATIONS

This application is a continuation of U.S. application Ser. No. 17/564,409, filed Dec. 29, 2021, which is a continuation of U.S. application Ser. No. 17/039,721 (now U.S. Pat. No. 11,247,132), filed Sep. 30, 2020, which is a continuation of U.S. application Ser. No. 15/908,551 (now U.S. Pat. No. 10,821,365), filed Feb. 28, 2018, which claims priority to Japanese Application No. 2017-051442, filed Mar. 16, 2017, the entire contents of each of which are incorporated herein by reference.

BACKGROUND

The present disclosure relates to a program and a control method.

Conventionally known is a game in which groups, to each of which a plurality of users belong, compete with each other. For example, disclosed in Japanese Patent No. 5477929 is a game in which groups compete against each other.

Conventionally, in a game in which groups compete with each other, a multi-play is typically employed in which a plurality of users perform manipulations to play games. However, for example, those users who are fond of a single play for one single user may avoid a multi-play. In such a case, for example, the probability of forming a cooperative relationship among users who belong to the same group may become lower.

SUMMARY

According to one aspect of the disclosure, there is provided a non-transitory computer-readable recording medium containing a program, which, when executed by processing circuitry of a terminal device configured to communicate with a server device, causes the processing circuitry to: execute a game part, the server device being for storing ranking information which includes a plurality of first points each corresponding to each of a plurality of user groups to each of which one or more users belong, the ranking information also including a rank of each user group determined based on the corresponding first point; in response to an execution result of the game part satisfying a first condition, transmit, to the server device, a request for changing the first point corresponding to a first user group among the plurality of user groups to which the user of the terminal device belongs; and receive, from the server device, the ranking information updated based on the first point after being changed.

BRIEF DESCRIPTION OF THE DRAWINGS

The disclosure, together with objects and advantages thereof, may best be understood by reference to the following description of the presently preferred embodiments together with the accompanying drawings in which:

FIG. 2 is a view illustrating information relating to users;

FIG. 3 is a view illustrating information relating to user groups;

FIG. 4 is a view illustrating information relating to game parts;

FIG. 5 is a view illustrating ranking information;

FIG. 6 is a view illustrating a provision table;

FIG. 7 is a view illustrating a retrieval table;

DETAILED DESCRIPTION

Figure 1:
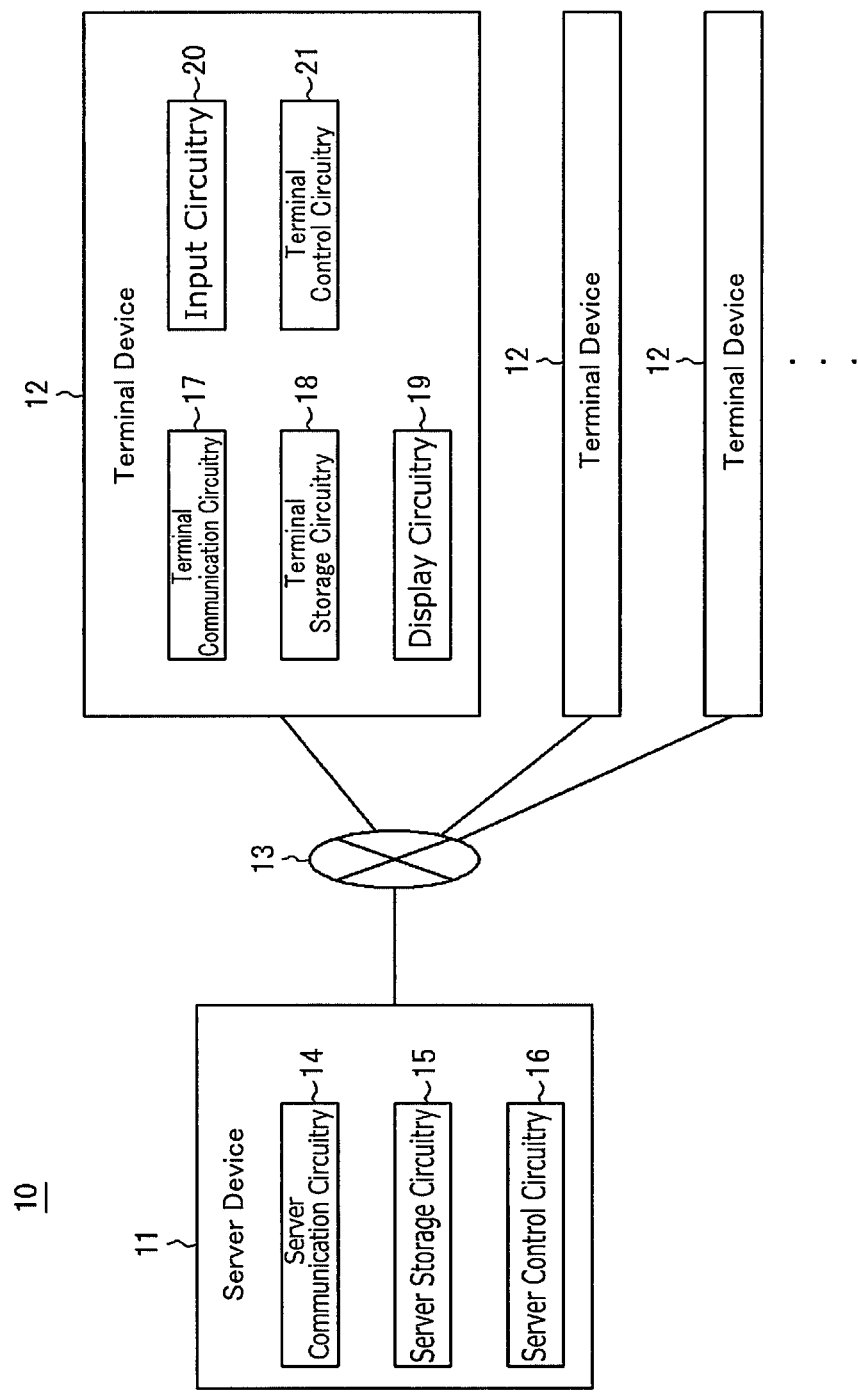
FIG. 1 is a block diagram illustrating a game system according to an embodiment of the present disclosure.

The purpose of the present disclosure is to provide a program and a control method which are capable of promoting the formation of a cooperative relationship among users.

In order to achieve the above-mentioned object, according to an aspect of the present disclosure, there is provided a non-transitory computer-readable recording medium containing a program, wherein the program allows a processor of a server device capable of communicating with a plurality of terminal devices used by a plurality of respective users to execute the following steps when the program is executed by the processor: storing ranking information which includes a plurality of first points each corresponding to each of a plurality of user groups to each of which one or more users belong, the ranking information also including a rank of each user group determined on the basis of the corresponding first point; in response to an execution result of a game part executed by a first terminal device among the plurality of terminal devices satisfying a first condition, changing the first point corresponding to a first user group among the plurality of user groups to which the user of the first terminal device belongs; and updating the ranking information on the basis of the first point after being changed.

According to another aspect, there is provided a non-transitory computer-readable recording medium containing a program, wherein the program allows a processor of a terminal device to execute the following steps, the terminal device capable of communicating with a server device for storing ranking information which includes a plurality of first points each corresponding to each of a plurality of user groups to each of which one or more users belong, the ranking information also including a rank of each user group determined on the basis of the corresponding first point: executing a game part; in response to an execution result of the game part satisfying a first condition, transmitting, to the server device, a request for changing the first point corresponding to a first user group among the plurality of user groups to which the user of the terminal device belongs; and receiving, from the server device, the ranking information updated on the basis of the first point after being changed.

According to yet another aspect, there is provided a method for controlling a terminal device capable of communicating with a server device for storing ranking information which includes a plurality of first points each corresponding to each of a plurality of user groups to each of which one or more users belong, the ranking information also including a rank of each user group determined on the basis of the corresponding first point, the method including the following steps: executing a game part; in response to an execution result of the game part satisfying a first condition, transmitting, to the server device, a request for changing the first point corresponding to a first user group among the plurality of user groups to which the user of the terminal device belongs; and receiving, from the server device, the ranking information updated on the basis of the first point after being changed.

Other aspects and advantages of the disclosure will become apparent from the following description, taken in conjunction with the accompanying drawings, illustrating by way of example the principles of the disclosure.

Now, the present disclosure will be explained below in more detail with reference to the accompanying drawings in accordance with the embodiments.

(Game System)

Referring to FIG. 1, description will be made with regard to a game system 10 according to an embodiment of the present disclosure. The game system 10 includes a server device 11 and a plurality of terminal devices 12. Although three terminal devices 12 are illustrated in FIG. 1 for the sake of convenience, two or more terminal devices 12 may be employed.

The server device 11 is an information processor such as a server managed by a game operator, for example. The terminal device 12 is an information processor used by users such as a mobile phone, a smartphone, a tablet terminal, a PC (Personal Computer), or a gaming device, for example. The server device 11 and the terminal device 12 are communicatively connected to each other over a network 13 such as the Internet. For example, the server device 11 and the terminal device 12 execute various types of processing relating to games in collaboration with each other.

(Outline of Game)

Now, description will be made with regard to the outline of games according to this embodiment. The games according to this embodiment include various game parts, i.e., the content that can be played by the user in the games. At least some of the various game parts may be executed using game contents.

The game contents are, e.g., electronic data media corresponding to any object to be used in the games, such as a card, an item, a virtual currency, a ticket, a character, and an avatar. Furthermore, the game content is the electronic data that the user can acquire, own, use, manage, exchange, compose, strengthen, sell, discard, or donate, etc., in the games; however, the way of using a game content is not limited to those explicitly mentioned herein.

Hereinafter, unless otherwise explicitly mentioned, "the user owned game content" is referred to as the game content that is associated with the user ID by which the user can be uniquely identified as the one the user has. "Assigning the game content to the user" refers to associating the game content, as an owned game content, with the user ID. "Discarding the user-owned game content" refers to cancelling the association of the user ID with the owned game content. "Consuming the user owned game content" indicates that certain effects or influences can be produced in the games in response to the cancellation of the association of the user ID with the owned game content. "Selling the user owned game content" indicates that the association of the user ID with the owned game content is cancelled, and the user ID is associated, as an owned game content, with another game content (e.g., a virtual currency or an item). "Transferring the owned game content of user A to user B" indicates that the association of the user ID of user A with the user's owned game content is cancelled, and the user ID of user B is associated with the game content as an owned game content. "Creating the game content" indicates that at least part of information relating to the game content is defined or determined. The information relating to the game content will be discussed later in detail.

The game part may include, e.g., a quest, mission, or mini game; fostering, strengthening, or composing of a game content; or a game content retrieval event, a virtual space search event, and a match event with an opponent (e.g., another user, an enemy character, and an enemy's building, etc.). Each game part may be provided with one or more predetermined tasks (game tasks). For example, when it is determined that one or more game tasks set to a game part played by a user have been successfully achieved, the user may be given, as a reward, for example, a game content, etc. The game task to be employed can be any task depending on the content of the game part, e.g., a task to win the match with an enemy character, a task to reach a goal point in a virtual space, and a task that until a predetermined time is elapsed, the character of the user will not be driven to a predetermined state (e.g., a state in which any behavior is impossible), etc. Meanwhile, achieving a particular task (task to be completed) among one or more game tasks set to a game part is referred to as clearing the game part. When the user playing a game part has successfully achieved the task to be completed, the game part may be determined to have been cleared, and the game part may be ended.

Various game parts may include a single play game part and a multi-play game part. For example, the single play game part may include a game part (e.g., a game part for one user) that is executed in response to a user manipulation on one terminal device 12 used by one user. For example, a single play game part is executed singly by one terminal device 12 or in collaboration with one terminal device 12 and the server device 11. However, the multi-play game part may include a game part which is executed, for example, in response to user manipulations on two or more terminal devices 12 used respectively by two or more users and which is common to the two or more users (e.g., a game part for a plurality of users). The game parts common to two or more users may include a game part in which, for example, at least part of processing of progress of the game part and at least part of the results of the processing are applied in common to the two or more users. For example, two or more terminal devices 12 collaborate or two or more terminal devices 12 and the server device 11 collaborate to execute a multi-play game part. One game part may correspond to both the single play and the multi-play.

Games according to this embodiment include a particular game part for a single play. The user selects one or more game contents to be used for a particular game part (game contents to be used) of those game contents owned by the user (owned game contents). Hereinafter, the one or more game contents to be used will be collectively also referred to as a deck. The particular game part is a game part in which the user manipulates a game content being used (e.g., a character, etc.) included in the deck and which includes an action game element of competing against an opponent emerging into the virtual space (e.g., an enemy character or enemy building, etc.). For example, the opponent is a game content, such as an NPC (Non-Player Character), that is automatically manipulated, but is not limited thereto. For example, the opponent may also be a game content that is manipulated by another user. The type and number of emerging opponents may be predetermined, for example, by the game provider, or may also be determined depending on the progress of the game or at random. For example, until a predetermined time limit is elapsed, a new opponent may emerge every time the opponent is defeated. Defeating more opponents within a time limit leads to a higher game score. The user aims to acquire a higher score.

The particular game part is not limited to the examples detailed above. For example, the particular game part may also include an element such as a rhythm game in which the user aims to acquire higher scores. Furthermore, for example, the particular game part may also include an element such as a race game or puzzle game in which the user aims at shorter clear times.

When the user plays a particular game part, a second point (e.g., a score or clear time, etc.) is computed which is indicative of an execution result of the particular game part. Furthermore, the particular game part is assigned a predetermined computation period. For each user, stored is a second point indicative of the best execution result of a particular game part within a computation period (e.g., the maximum score or the shortest clear time, etc.). The second point is an indicator that suggests whether the execution result of a game part is good or bad. In this embodiment, the greater the second point (e.g., score), the better the execution result of the game part. However, for example, in another embodiment in which the game part includes an element such as a race game, it may also be acceptable that the smaller the second point (e.g., clear time), the better the execution result of the game part.

Furthermore, defined are a plurality of user groups to each of which one or more users belong. For each user group, a first point is stored. The first point is an indicator that suggests for each user group whether the execution result of a game part is good or bad. For example, the first point may be defined on the basis of a second point indicative of the best execution result of a particular game part for one or more users who belong to a user group. For example, the first point may also be a total value of second points of one or more users (e.g., a total value of maximum scores or a total value of shortest clear times, etc.). Furthermore, on the basis of the first point, the rank of each of a plurality of user groups is determined. When a computation period is elapsed, for example, each user belonging to an upper level user group is assigned a game content, etc., as a reward.

(Configuration of Server Device)

Description will be made with regard to a specific configuration of the server device 11. The server device 11 includes server communication circuitry 14, server storage circuitry 15, and server control circuitry 16.

The server communication circuitry 14 includes an interface for communicating with an external device wirelessly or by wire to transmit and receive information. The server communication circuitry 14 may also include, for example, a wireless LAN (Local Area Network) communication module or a wired LAN communication module. The server communication circuitry 14 is capable of transmitting and receiving information to and from the terminal device 12 over the network 13.

The server storage circuitry 15 includes, for example, a primary storage device and a secondary storage device. For example, the server storage circuitry 15 may also include a memory, as a non-transitory storage medium, such as a semiconductor memory, a magnetic memory, or an optical memory. The server storage circuitry 15 stores various types of information and programs to be used to process games. At least some of the information and programs stored in the server storage circuitry 15 may also be shared and synchronized with the terminal device 12. Now, description will be made with regard to a specific example of information to be used to process games.

(Information Relating to User)

The server storage circuitry 15 stores information relating to users (hereinafter, "user information"). Referring to FIG. 2, description will be made with regard to the user information. FIG. 2 depicts information relating to each of two or more users. The user information includes various types of information unique to the user. For example, the user information includes information relating to a user ID, a user name, and a game content. In the user information, the information relating to the user name and the game content is associated with the user ID.

The user ID is information by which a user can be uniquely identified. Hereinafter, the user ID will also be referred to simply as the user.

The user name is the information that is indicative of the name of a user. Unlike the user ID, the user name may not need to be capable of uniquely identifying the user. The user name may also be determined and changed depending on a user manipulation on the terminal device 12.

The information relating to the game content includes various types of information unique to the owned game content that the user owns in a game. When the user has acquired a game content, the game content is associated with the user as an owned game content. For example, the information relating to the game content may also include the game content ID, the game content name, a game parameter, and image data indicative of the game content.

The game content ID is the information that can uniquely identify the game content singly or in combination with the user ID. Hereinafter, the game content ID will also be referred to simply as the game content.

The game content name is the information that is indicative of the name of the game content. Unlike the game content ID, the game content name may not need to be capable of uniquely identifying the game content. The initial value of the game content name may be predetermined, e.g., by the provider of the game. The game content name may also be arbitrarily determined and changed in response to a user manipulation on the terminal device 12.

The game parameter includes various types of parameters to be used for various processing relating to the game content. For example, the game parameter may also include the degree of soundness and the offensive power of the game content.

The degree of soundness is a parameter that is indicative of the deterioration level of the game content during the execution of a particular game part. For example, the degree of soundness may include the physical strength of a character and the durability of a building, etc. When the degree of soundness is reduced to a predetermined value, at least part of the function of the game content becomes invalid during the execution of a particular game part. For example, when the physical strength of a character is reduced to a predetermined value (e.g., zero), the character may become incapable of movement. Furthermore, for example, when the durability of a building is reduced to a predetermined value (e.g., zero), the building may be allowed to collapse. Thus, it is more advantageous to the user that the game content to be used by the user is greater in the degree of soundness.

For example, the offensive power is a parameter that contributes to the amount of damage to be inflicted by the attack of the game content to a game content that is an opponent. The greater the value of the offensive power, the greater the amount of damage to be inflicted on the opponent. For example, the degree of soundness of the opponent is reduced by the amount of damage that the attack of the game content inflicts on the opponent. When the degree of soundness of the opponent is reduced to a predetermined value, it may be determined that the opponent has lost the match. Thus, it is more advantageous to the user if the game content being used by the user has a greater offensive power.

The content of the user information is not limited to those mentioned above. For example, the user information may also include information relating to one or more decks. Among the user owned game contents, the deck information is indicative of the combination of one or more game contents to be used for the execution of a game part. Furthermore, for example, the content of the aforementioned game parameters may differ depending on the content of a particular game part. For example, in another embodiment in which the particular game part includes a race game element, the game parameter may also include the maximum speed and acceleration of the game content (e.g., an automobile).

(Information Relating to User Group)

The server storage circuitry 15 shown in FIG. 1 stores information relating to user groups (hereinafter, "the user group information"). Referring to FIG. 3, description will be made with regard to the user group information. FIG. 3 depicts information relating to each of two or more user groups. The user group information includes various types of information unique to the user groups. For example, the user group information includes a user group ID, a user group name, and member information. In the user group information, the user group name and the member information are associated with the user group ID.

The user group ID is the information that can uniquely identify user groups. Hereinafter, the user group ID will also be referred to simply as the user group.

The user group name is the information that is indicative of the name of a user group. Unlike the user group ID, the user group name may not need to be capable of uniquely identifying user groups. The user group name may also be determined and changed in response to a user manipulation on the terminal device 12.

The member information includes the user ID of each user who belongs to a user group. For example, the member information shown in FIG. 3 indicates that two users "user 001" and "user 002" belong to a user group "group 001," and one user "user 011" belongs to a user group "group 002." It is acceptable to specify the upper limit number of users (e.g., 20 persons) that can belong to a user group. Hereinafter, a user associated with a user group in the user group information will also be referred to as a member of the user group.

One or more users who belong to a user group (management user) may have a predetermined authority. For example, the management user may have an authority of determining whether to permit another user to join in the user group or to leave the user group. Furthermore, for example, the management user may have an authority to change a provision table corresponding to a user group. The provision table will be discussed later.

(Information Relating to Game Part)

The server storage circuitry 15 shown in FIG. 1 stores information relating to game parts (hereinafter, "the game part information"). Referring to FIG. 4, description will be made with regard to the game part information. FIG. 4 depicts information relating to each of two or more particular game parts. Hereinafter, the particular game part will also be referred to simply as the game part. The game part information includes various types of information unique to the game part. For example, the game part information includes a game part ID, a game part name, game data, a computation period, and group set information. In the game part information, the game part name, the game data, the computation period, and the group set information are associated with the game part ID.

The game part ID is information which can uniquely identify game parts. Hereinafter, the game part ID will also be referred to simply as the game part.

The game part name is the information that is indicative of the name of the game part. Unlike the game part ID, the game part name may not need to be capable of uniquely identifying game parts. For example, the game content name may be predetermined by the game provider.

The game data includes various types of information to be used to execute game parts. For example, the game data may include so-called asset data such as image data and audio data to be used to execute game parts. The game data may include information relating to a game content, which is an opponent (e.g., an enemy character or enemy building, etc.). As will be discussed later, the server device 11 may transmit game data to the terminal device 12. The terminal device 12 is capable of executing the game part using the game data received.

The computation period is the information that is indicative of a predetermined period. For example, the computation period may be predetermined by the provider of games. As will be discussed later, for each user, ranking information is stored in the server storage circuitry 15, the ranking information including the second point indicative of the best execution result of a particular game part within a computation period (e.g., the maximum score).

The group set information includes a set ID and a plurality of user group IDs. In the group set information, the plurality of user group IDs are associated with the set ID.

The set ID is the information by which a plurality of user groups can be identified in combination with the game part ID. The plurality of user groups to be associated with the combination of the set ID and the game part ID may be predetermined, e.g., by the provider of the game before the start of the computation period of the game part. Alternatively, the plurality of user groups to be associated with the combination of the set ID and the game part ID may also be determined by the server device 11 before the start of the computation period of the game part. In this embodiment, in one game part, one user group is associated with any one set ID, but may also be associated with a plurality of set IDs. Each combination of the set ID and the game part ID is associated with the ranking information to be discussed later.

(Ranking Information)

The server storage circuitry 15 shown in FIG. 1 stores ranking information for each combination of a set ID and a game part ID. Referring to FIG. 5, the ranking information will be described below. For example, FIG. 5 depicts the ranking information corresponding to the combination of the game part ID "part 001" and the set ID "set 001." The ranking information includes, for example, a plurality of user group IDs, a plurality of first points corresponding to each of the plurality of user group IDs, and the rank of each of the plurality of user groups. The ranking information may further include one or more user IDs corresponding to each user group ID, and a second point corresponding to each user ID.

The plurality of user group IDs are associated with the combination of the set ID and the game part ID in the aforementioned game part information.

The plurality of first points are a parameter that is associated with a user group. For example, the first point may also be the total value of the second points corresponding to each user ID associated with a user group in the ranking information.

The rank is indicative of the rank of each of a plurality of user groups determined on the basis of the plurality of first points. For example, the greater (or the smaller) the corresponding first point, the higher the rank of a user group becomes. For example, the rank of a user group with a corresponding first point being the maximum (or minimum) is determined to be the first place that is the uppermost place.

The one or more user IDs are a user ID of the user who plays a game part when the user belongs to the corresponding user group and for whom a second point indicative of the best execution result of the game part within a computation period is determined. As described above, the first point of a user group is the total value of the second points of each user associated with the user group. Thus, the user associated with a user group in the ranking information suggests the user who contributes to the ranking of the user group in that the user is related to the determination of the rank (or the first point) of the user group. In the ranking information, the upper limit number of users associated with one user group (e.g., 20 users) may be specified. Hereinafter, in the ranking information, the user associated with a user group will also be referred to as a contributive user corresponding to the user group.

In the example shown in FIG. 5, two or more users, including "user 001" and "user 002," contribute to the ranking of user group "group 001." Furthermore, two or more users including "user 101" and "user 102" contribute to the ranking of the user group "group 100."

However, since the first point of the user group "group 002" is null, there exists no user who contributes to the ranking of the user group. For example, this suggests that no user who belongs to the user group "group 002" plays any game part within the computation period, or alternatively, a user may have played but not until the second point is determined. For example, when a "game over" is encountered during the play of a game part, the second point may not have to be determined. However, when a "game over" is not encountered during the play of a game part, and for example, a task to be completed is achieved, the second point indicative of the execution result of the game part may be determined.

The second point is indicative of the best execution result of the game part that is determined by a corresponding user playing a game part within a computation period.

More specifically, when a user who belongs to a user group plays a game part, and the second point indicative of the best execution result of the game part within the computation period is determined, the user and the second point are associated with the user group in the ranking information.

In this embodiment, the correlation between the user and the user group in the ranking information is managed independently of the correlation between the user and the user group in the aforementioned user group information. That is, a member of a user group does not always coincide with a contributive user corresponding to the user group. For example, consider the case where, after a user (and a second point) is associated with a user group in the ranking information, the user has left the user group. In such a case, when the user leaves the user group, the association between the user and the user group in the user group information is cancelled. However, the association between the user (and the second point) and the user group in the ranking information is not immediately cancelled. In such a case, the user is not a member of the user group, but may be a contributive user corresponding to the user group.

In another embodiment, when the user leaves the user group, the association between the user and the user group in the user group information may be cancelled, and the association between the user (and the second point) and the user group in the ranking information may also be cancelled. The cancellation of the association in the ranking information causes the user ID and the second point of the user to be erased from the ranking information. In such a case, the first point of the user group is decreased, for example, by the amount of the second point of the user. The decrease in the first point of the user group may change the rank of the user group.

In the ranking information, the upper limit number of contributive users associated with one user group may be specified (e.g., 20 users). Now, description will be made with regard to the case where in the ranking information, the upper limit number of contributive users has already been associated with a user group.

In such a case, it is acceptable to prohibit the execution of the game part on the terminal device 12 of a new member who has just joined the user group.

Alternatively, even when the best execution result of a game part executed on the terminal device 12 of a new member is determined within a computation period, the execution result may not have to be reflected in the ranking information. Here, when the best execution result within the computation period of a game part executed on the terminal device 12 of the new member is determined, and predetermined conditions are satisfied, the execution result may be reflected in the ranking information.

For example, the conditions may include a condition that there exist one or more contributive users who are corresponding to a user group and who are not a member of the user group. The conditions may further include a condition that the second point indicative of the best execution result of a game part on the terminal device 12 of a new member is equal to or greater than the second point of at least one of one or more contributive users who are not a member of the user group. In such a case, in the ranking information, the association between the contributive user having the minimum second point among the one or more contributive users and the user group may be cancelled, and meanwhile, the new member may be associated as a contributive user with the user group. According to such an arrangement, even a new member having joined the user group with which the upper limit number of contributive users are already associated can contribute to the ranking of the user group in place of a contributive user who has already left from the user group. This may cause, for example, a decrease in the probability of occurrence of an inconvenience, e.g., that a new member cannot contribute to the ranking of the user group, and an improvement in the level of user's satisfaction with games.

(Provision Table)

The server storage circuitry 15 shown in FIG. 1 stores a provision table for each user group. The provision table is the information to be used to execute a game part "group shop" to be discussed later. Referring to FIG. 6, the provision table will be described. For example, FIG. 6 depicts a provision table corresponding to a user group "group 001." In the provision table, one or more patterns are associated with the user group ID. Each pattern is associated with one or more combinations of game contents and the count thereof. The number of combinations of game contents and the count thereof associated with each pattern may be the same or different for each pattern. In the example shown in FIG. 6, each row of the provision table corresponds to each pattern, and each column corresponds to each combination of game contents and the count thereof. In each column of the provision table, the game content ID and the count are specified ({GAME CONTENT ID, COUNT}). The game content ID and the count shown in each column of the provision table may be common to each user group or different for each user group.

As will be discussed later, for each user group, any one of a plurality of patterns included in the provision table is selected. The selected pattern is used to determine a retrieval table to be discussed later.

As will be discussed later, the management user who belongs to a user group may change the provision table. For example, the ninth pattern (the ninth row) and the ninth set of a game content and a count (the ninth column) shown by broken lines in FIG. 6 may be added in response to a request by the management user.

(Retrieval Table)

The server storage circuitry 15 shown in FIG. 1 stores a retrieval table for each user who belongs to a user group. The retrieval table is the information to be used to execute a game part "group shop" to be discussed later. Referring to FIG. 7, description will be made with regard to the retrieval table. For example, FIG. 7 depicts a retrieval table corresponding to a user "user 001" who belongs to a user group "group 001." The retrieval table includes one or more combinations of a game content and a remaining count corresponding to one pattern selected from the provision table corresponding to the user group.

"The remaining count" is a parameter with "the count" shown in the provision table as an initial value. As will be discussed later, when a certain game content shown in the retrieval table is acquired by the user in the game part "group shop," the remaining count corresponding to the game content, that is, the remaining number which the game content can be acquired is reduced. The game content can be acquired only when the remaining count corresponding to the game content is one or more.

The information to be stored in the server storage circuitry 15 shown in FIG. 1 is not limited to that mentioned above. The server storage circuitry 15 may also store any information to be used to execute games.

The server control circuitry 16 includes one or more processors. The processors may include a general-purpose processor for achieving a particular function by reading a particular program, and a special-purpose processor for specialized uses in particular processing. The server control circuitry 16 controls the operation of the entire server device 11. Now, an example of the operation of the server control circuitry 16 will be specifically described below.

The server control circuitry 16 stores various types of information and programs to be used to process games in the server storage circuitry 15. The information to be used to process games may include the user information, the user group information, the game part information, the ranking information, the provision table, and the retrieval table, which have been explained above. The processing for storing information may include any processing, for example, processing for associating a plurality of pieces of information that are different from each other, and processing for determining at least some of the pieces of information, etc. For example, the processing for storing the user information may include the processing for associating each of a plurality of users with information relating to user's owned game content to store the resulting information. Furthermore, for example, the processing for storing the game part information may include the processing for determining the group set information that is part of the game part information.

The server control circuitry 16 transmits and receives information via the server communication circuitry 14. For example, the server control circuitry 16 may transmit at least part of the information stored in the server storage circuitry 15 to the terminal device 12. In this manner, the information stored in the server storage circuitry 15 and the information stored in the terminal device 12 are shared and synchronized. The timing at which the information is shared and synchronized may be arbitrarily specified, but may include, for example, the timing at which new information is stored in the server storage circuitry 15, and the timing at which the information stored in the server storage circuitry 15 is updated.

The server control circuitry 16 executes various game processing singly or in cooperation with the terminal device 12. For example, the server control circuitry 16 executes processing relating to various game parts singly or in cooperation with the terminal device 12. The processing to be executed by the server device 11 singly or in cooperation with the terminal device 12 will be discussed later in detail.

(Configuration of Terminal Device)

The configuration of the terminal device 12 will be specifically described below. The terminal device 12 is provided with terminal communication circuitry 17, terminal storage circuitry 18, display circuitry 19, input circuitry 20, and terminal control circuitry 21.

The terminal communication circuitry 17 includes an interface for communicating with an external device wirelessly or by wire so as to transmit and receive information. For example, the terminal communication circuitry 17 may also include a wireless communication module compatible with mobile communication standards such as LTE (Long Term Evolution) (registered trademark), a wireless LAN communication module, or a wired LAN communication module. The terminal communication circuitry 17 is capable of transmitting and receiving information to and from the server device 11 over the network 13.

For example, the terminal storage circuitry 18 includes a primary storage device and a secondary storage device. For example, the terminal storage circuitry 18 may also include a memory, as a non-transitory storage medium, such as a semiconductor memory, a magnetic memory, or an optical memory. The terminal storage circuitry 18 stores various types of information and programs to be used to process games. For example, the various types of information and programs to be used to process games may be retrieved from at least one of the server device 11 and another external server over the network 13. For example, an application program for a game may be retrieved from the another external server. Hereinafter, the application program will also be referred to simply as an application.

For example, the display circuitry 19 includes a display such as a liquid crystal display or an organic EL display. The display circuitry 19 is capable of displaying various views.

The input circuitry 20 includes an input interface for receiving a user manipulation on the terminal device 12. The input interface may include, for example, a touch panel physical key integrated with the display circuitry 19, and a pointing device such as a mouse or a touch pad.

The terminal control circuitry 21 includes one or more processors. The processors may include a general-purpose processor for achieving a particular function by reading a particular program, and a special-purpose processor for specialized uses in particular processing. The terminal control circuitry 21 controls the operations of the entire terminal device 12. The terminal control circuitry 21 processes games in cooperation with the server device 11. Now, an example of the operation of the terminal control circuitry 21 will be specifically described below.

The terminal control circuitry 21 transmits and receives information via the terminal communication circuitry 17. For example, the terminal control circuitry 21 receives various types of information and programs to be used to process games from at least one of the server device 11 and another external server. The terminal control circuitry 21 stores the received information and programs in the terminal storage circuitry 18.

The terminal control circuitry 21 starts a game application in response to a user manipulation. The terminal control circuitry 21 processes the game in cooperation with the server device 11. For example, the terminal control circuitry 21 allows various types of views to be displayed on the display circuitry 19. For example, the display circuitry 19 may display a GUI (Graphic User Interface) for detecting a user manipulation on the screen. The terminal control circuitry 21 is capable of detecting a user manipulation on the screen via the input circuitry 20.

The terminal control circuitry 21 executes various game processing singly or in cooperation with the server device 11. For example, the terminal control circuitry 21 executes processing relating to various game parts singly or in cooperation with the server device 11.

Description will be made specifically with regard to an example of game processing to be executed by the server device 11 and the terminal device 12 each singly or in collaboration with each other.

(Processing Relating to Game Part)

Description will be made with regard to the processing relating to a game part to be executed by the server device 11 and the terminal device 12 in collaboration with each other. The server control circuitry 16 of the server device 11 stores the ranking information in the server storage circuitry 15.

The terminal control circuitry 21 of the terminal device 12 transmits a request for executing a game part to the server device 11, for example, in response to a user manipulation.

Upon reception of a request for executing the game part from the terminal device 12, the server control circuitry 16 copies at least part of the ranking information corresponding to the user group to which the user of the terminal device 12 belongs. Of the ranking information, at least part of the ranking information to be copied may include a portion corresponding to the user group, and a portion corresponding to one or more other user groups above the user group in ranking. The server control circuitry 16 associates the copied ranking information with the user and then temporarily stores the resulting information in the server storage circuitry 15. Hereinafter, the copied ranking information will also be referred to as the past ranking information. The past ranking information associated with the user is the ranking information at the point of time at which the terminal device 12 of the user executes the game part. As will be discussed later, the past ranking information may be used to display predetermined information on the terminal device 12.

The past ranking information copied and stored in association with the user is managed independently of the ranking information of the copy source. For example, the ranking information of the copy source may change each time the game part is executed by the terminal device 12 of some user. However, for example, the past ranking information stored in association with user A may not change even when the game part is executed on the terminal device 12 of another user other than user A. As will be discussed later, the past ranking information stored in association with user A may change when the game part is executed on the terminal device 12 of user A.

When the past ranking information is stored in the server storage circuitry 15, the server control circuitry 16 transmits a command for executing a game part to the terminal device 12. The execution command may include any information to be used to execute the game part. For example, the information to be used to execute the game part may include the game data of the game part and the aforementioned past ranking information, but is not limited thereto. For example, the information to be used to execute a game part may include the user information, the user group information, the game part information, the ranking information, the provision table, and the retrieval table.

Upon reception of a command for executing a game part from the server device 11, the terminal control circuitry 21 executes the game part. The terminal control circuitry 21 allows the game part to progress, for example, in response to a user manipulation or automatically.

Here, as described above, the game part according to this embodiment includes the element of an action game in which the user manipulates a game content (e.g., a character) in use included in the deck so as to match the same (e.g., an enemy character and an enemy building, etc.) against an opponent emerging in a virtual space. For example, the terminal control circuitry 21 puts the game content to be used and the opponent in the virtual space. The terminal control circuitry 21 matches the game content being used against the opponent in response to a user manipulation. When the degree of soundness of the opponent is reduced to a predetermined value (e.g., zero), the terminal control circuitry 21 determines that the user has won the match with the opponent. The terminal control circuitry 21 may also allow a new opponent to emerge in the virtual space.

For example, at the point of time at which a predetermined time limit has elapsed since the game part was started, the terminal control circuitry 21 determines that the game was cleared when the degree of soundness of at least one game content being used indicated in the information relating to the deck is greater than a predetermined value (e.g., zero). When it is determined that the game was cleared, the terminal control circuitry 21 determines the second point (e.g., a score) as the execution result of the game part, and then exits the game part.

In this embodiment, the better the execution result of the game part, the greater the second point (e.g., the score). For example, the terminal control circuitry 21 may provide control in a manner such that the second point may be increased as the number of opponents the user wins increases. In this embodiment, the terminal control circuitry 21 may also change the difficulty level of the game part, for example, in response to a user manipulation. For example, as the difficulty level of the game part increases, the opponent may be strengthened, while the second point may be increased in a greater manner when the user wins the opponent.

Meanwhile, the terminal control circuitry 21 determines that the game is over when the degree of soundness of each game content in use indicated in the information relating to the deck is reduced to a predetermined value before the time limit is elapsed. When the game is determined to be over, the terminal control circuitry 21 exits the game part without determining the second point indicative of the execution result of the game part.

Alternatively, even when the game is determined to be over, the terminal control circuitry 21 may determine the second point indicative of the execution result of the game part. More specifically, the terminal control circuitry 21 determines the second point indicative of the execution result of the game part on the basis of the progress of the game part during the period from the start of the game part until the game is determined to be over. For example, the terminal control circuitry 21 may increase the second point as the number of opponents the user wins in the period increases. Furthermore, the terminal control circuitry 21 may also lower the second point to be computed comparing with the case where the game is not over, for example, by reducing the second point or multiplying the second point by a coefficient less than unity, etc.

When the execution result of the game part is determined, the terminal control circuitry 21 transmits the execution result of the game part to the server device 11.

Upon reception of the execution result of the game part from the terminal device 12, the server control circuitry 16 determines whether the execution result satisfies a predetermined condition (the update condition). For example, the update condition may include a condition that the execution result is received within the computation period of the game part. Furthermore, for example, the update condition may also include a condition that the execution result is the best among those of the game parts executed by the terminal device 12 within the computation period. More specifically, the server control circuitry 16 determines that the update condition is satisfied when the second point indicative of the execution result (e.g., the score) received from the terminal device 12 within the computation period is the maximum (e.g., the maximum score) among those of the game parts executed by the terminal device 12 within the computation period.

When it is determined that the update condition is not satisfied, the server control circuitry 16 may discard the past ranking information stored in the server storage circuitry 15. Then, the processing relating to the game part is ended.

However, when it is determined that the update condition is satisfied, the server control circuitry 16 may associate the combination of the user and the initial value of the second point (e.g., zero) with the user group to which the user belongs in the ranking information stored in the server storage circuitry 15. Furthermore, the server control circuitry 16 changes each of the second point of the user and the first point of the user group in the ranking information.

More specifically, the server control circuitry 16 changes the second point of the user in the ranking information so as to become equal to the second point indicative of the execution result received from the terminal device 12. For example, to change the second point, the server control circuitry 16 may execute any processing such as overwriting the second point or increasing or decreasing the second point in the ranking information. In this embodiment, the second point in the ranking information is increased.

Furthermore, more specifically, the server control circuitry 16 changes the first point of the user group in the ranking information by the amount of change in the second point of the user. In this embodiment, the first point of the user group is increased by the amount of increase in the second point of the user.

Here, when the update condition is determined to be satisfied, and in the ranking information, the user (and the second point) is not associated with another user group that is different from the user group to which the user current belongs, the server control circuitry 16 may change each of the second point of the user and the first point of the user group to which the user belongs in the ranking information. In other words, when the update condition is determined to be satisfied, and the user is not a contributive user corresponding to another user group, the server control circuitry 16 may change each of the second point of the user and the first point of the user group to which the user belongs in the ranking information. According to such an arrangement, the user can contribute to the ranking of the user group to which the user currently belongs as long as the user does not contribute to the ranking of another user group to which the user belonged in the past. This therefore reduces the probability of occurrence of an inconvenience, e.g., that one user contributes to the ranking of a plurality of user groups. In the case of such an arrangement being employed, when the user is going to leave the user group, the server control circuitry 16 transmits a command for displaying alert information to the terminal device 12 of the user, and for example, may allow the user to leave the user group upon reception of an acknowledgement transmitted by the terminal device 12 in response to a user manipulation. For example, the alert information may include information suggesting that even when the user leaves the current user group and then belongs to another user group, the user cannot contribute to the ranking of that user group. More specifically, the alert information may include the message suggesting that once the user leaves the user group, the ranking information is not updated until the end of the computation period of the game part even if the user re-executes the game part, or the message suggesting that the user is prohibited from re-executing the game part.

When the second point of the user and the first point of the user group in the ranking information are changed, the server control circuitry 16 updates the ranking information stored in the server storage circuitry 15. More specifically, the server control circuitry 16 updates the rank of each user group on the basis of the first point of each user group in the ranking information.

When the second point of the user and the first point of the user group in the ranking information are changed, the server control circuitry 16 transmits, to the terminal device 12, a command for displaying the information indicating that the aforementioned update condition is satisfied. In this embodiment, the command for displaying information may also include any information to be used to display the information such as image data.

Upon reception of the command for displaying the information indicating that the update condition is satisfied, the terminal control circuitry 21 allows the information to be displayed on the display circuitry 19. A specific example of a view (the third view) on which the information is displayed will be discussed later.

When the second point of the user and the first point of the user group are changed in the ranking information, the server control circuitry 16 changes each of the second point of the user and the first point of the user group to which the user belongs in the aforementioned past ranking information. The amount of change in each of the second point and the first point in the past ranking information may be equal to the amount of change in each of the second point and the first point in the aforementioned ranking information.

The server control circuitry 16 determines whether the rank of the user group is changed in the past ranking information, on the basis of the first point having been changed in the past ranking information.

When it is determined that the rank of the user group in the past ranking information is not changed, the server control circuitry 16 may discard the past ranking information stored in the server storage circuitry 15. Then, the processing relating to the game part is ended.

However, when it is determined that the rank of the user group in the past ranking information is changed, the server control circuitry 16 transmits, to the terminal device 12, a command for displaying the information indicating that the rank of the user group has been changed. The server control circuitry 16 may discard the past ranking information stored in the server storage circuitry 15.

Upon reception of the command for displaying the information indicating that the rank of the user group is changed, the terminal control circuitry 21 allows the information to be displayed on the display circuitry 19. A specific example of a view (the fourth view) on which the information is displayed will be discussed later. Then, the processing relating to the game part is ended.

(Processing Relating to Reward)

Now, description will be made with regard to the processing relating to reward to be executed by the server device 11 and the terminal device 12 in collaboration with each other. When the computation period of the game part is ended, the server control circuitry 16 of the server device 11 identifies, on the basis of the ranking information, one or more user groups of a plurality of user groups indicated in the ranking information. For example, the server control circuitry 16 may identify a certain number of user groups from the top on the basis of the rank indicated in the ranking information.

The server control circuitry 16 identifies each user who contributed to the ranking of each identified user group. More specifically, the server control circuitry 16 identifies each user associated with each identified user group in the ranking information.

The server control circuitry 16 gives each identified user a reward. The reward may include a special game content, but may also include any game content. The special game content is a specific game content that is usable in a game part "group shop" to be discussed later. However, the use of the special game content is not limited thereto, but, for example, the special game content may be usable in another game part. More specifically, the server control circuitry 16 associates each identified user with a game content as a reward. For example, the content of the reward may be different depending on the rank of the user group to which the identified user contributed.

The server control circuitry 16 transmits a command for displaying information relating to the reward to the terminal device 12 of each user to whom the reward was given. More specifically, the server control circuitry 16 transmits, to the terminal device 12, a command for displaying any information relating to the game content given as a reward (e.g., the name and the count of the game content, etc.).

Upon reception of the command for displaying the information relating to the reward, the terminal control circuitry 21 of the terminal device 12 allows the information relating to the reward to be displayed on the display circuitry 19. Then, the processing relating to the reward is ended.

(Processing Relating to Group Shop)

Now, description will be made with regard to the processing relating to the game part "group shop" to be executed by the server device 11 and the terminal device 12 in collaboration with each other. In general, the group shop is a game part that enables acquirement of another game content, for example, by consuming a special game content the user acquired as a reward for the particular game part.

The server control circuitry 16 of the server device 11 stores a provision table corresponding to a user group in the server storage circuitry 15 for each user group.

The server control circuitry 16 selects any one of a plurality of patterns included in a provision table for each user group. It is possible to employ any algorithm as the processing for selecting any one of a plurality of patterns. For example, the server control circuitry 16 may select any one of a plurality of patterns in a random fashion. The probabilities of selecting each pattern may be the same or may be different for each pattern. Alternatively, the server control circuitry 16 may select one pattern in a predetermined order of a plurality of patterns.

For each user, on the basis of one selected pattern included in the provision table of the user group to which the user belongs, the server control circuitry 16 stores the retrieval table corresponding to the user in the server storage circuitry 15. More specifically, the server control circuitry 16 determines and then stores a retrieval table in the server storage circuitry 15, the retrieval table including one or more combinations of a game content and a count associated with one selected pattern included in the provision table as one or more combinations of a game content and a remaining count.

In this embodiment, the processing for selecting one pattern included in a provision table and the processing for storing the retrieval table of a user may be executed at predetermined time intervals (e.g., every day).

For example, in response to a request from the terminal device 12 of a user, the server control circuitry 16 transmits, to the terminal device 12, a command for displaying information relating to the retrieval table corresponding to the user.

Upon reception of the command for displaying information relating to the retrieval table, the terminal control circuitry 21 of the terminal device 12 allows the information to be displayed on the display circuitry 19. A specific example of a view on which the information is displayed (the sixth view) will be discussed later.

The terminal control circuitry 21 transmits a request for retrieving a game content shown in the retrieval table to the server device 11, for example, in response to a user manipulation.

Upon reception of the request for retrieving a game content from the terminal device 12, the server control circuitry 16 determines whether the number of special game contents associated with the user of the terminal device 12 is equal to or greater than a specified value corresponding to the game contents according to the retrieving request.

If the number of special game contents is less than the specified value, then the server control circuitry 16 may transmit, to the terminal device 12, for example, a command for displaying the information indicative of a shortage in the number of special game contents.

Meanwhile, when the number of special game contents is equal to or greater than the specified value, the server control circuitry 16 reduces the number of special game contents associated with the user by the specified value. Furthermore, the server control circuitry 16 performs the decrement of the remaining count of the game contents according to the retrieving request in the retrieval table corresponding to the user. Furthermore, the server control circuitry 16 associates the user with the game content according to the retrieving request. Then, the processing relating to the group shop is ended.

(Processing for Extending Provision Table)

Now, description will be made with regard to the processing for extending the provision table to be executed by the server device 11 and the terminal device 12 in collaboration with each other. The terminal control circuitry 21 of the terminal device 12 may transmit a first extension request for the provision table to the server device 11, for example, in response to a user manipulation. The first extension request is to increase the number of combinations of a game content and the count thereof corresponding to each of one or more patterns in the provision table corresponding to the user group to which the user of the terminal device 12 belongs. For example, it is acceptable that only the terminal device 12 of the management user is capable of transmitting the first extension request.

Upon reception of the first extension request, the server control circuitry 16 of the server device 11 increases, in the provision table, the number of combinations of a game content and the count corresponding to each of one or more patterns. In such a case, for example, in the provision table shown in FIG. 6, "the ninth column" may be additionally provided. The server control circuitry 16 may increase the number of combinations of a game content and the count corresponding to each pattern by allowing a predetermined game content (e.g., an item or a virtual currency) associated with the management user to be consumed. The game content according to a combination increased in response to the first extension request may be higher, e.g., in value, rarity, or performance, etc., than a game content according to another combination.

The terminal control circuitry 21 may transmit a second extension request for the provision table to the server device 11, for example, in response to a user manipulation. The second extension request is to increase the number of patterns included in the provision table corresponding to the user group to which the user of the terminal device 12 belongs. For example, it is acceptable that only the terminal device 12 of the management user is capable of transmitting the second extension request.

Upon reception of the second extension request, the server control circuitry 16 increases the number of patterns included in the provision table. In such a case, for example, in the provision table shown in FIG. 6, the row of pattern "9" may be additionally provided. The server control circuitry 16 may increase the number of patterns by allowing a predetermined game content (e.g., an item or a virtual currency) associated with the management user to be consumed. The game content corresponding to the pattern increased in response to the second extension request may be higher, e.g., in value, rarity, or performance, etc., than a game content corresponding to another pattern.

Referring to FIGS. 8 to 13, description will be made specifically with regard to example views to be displayed on the display circuitry 19 of the terminal device 12.

(First View)

Figure 8:
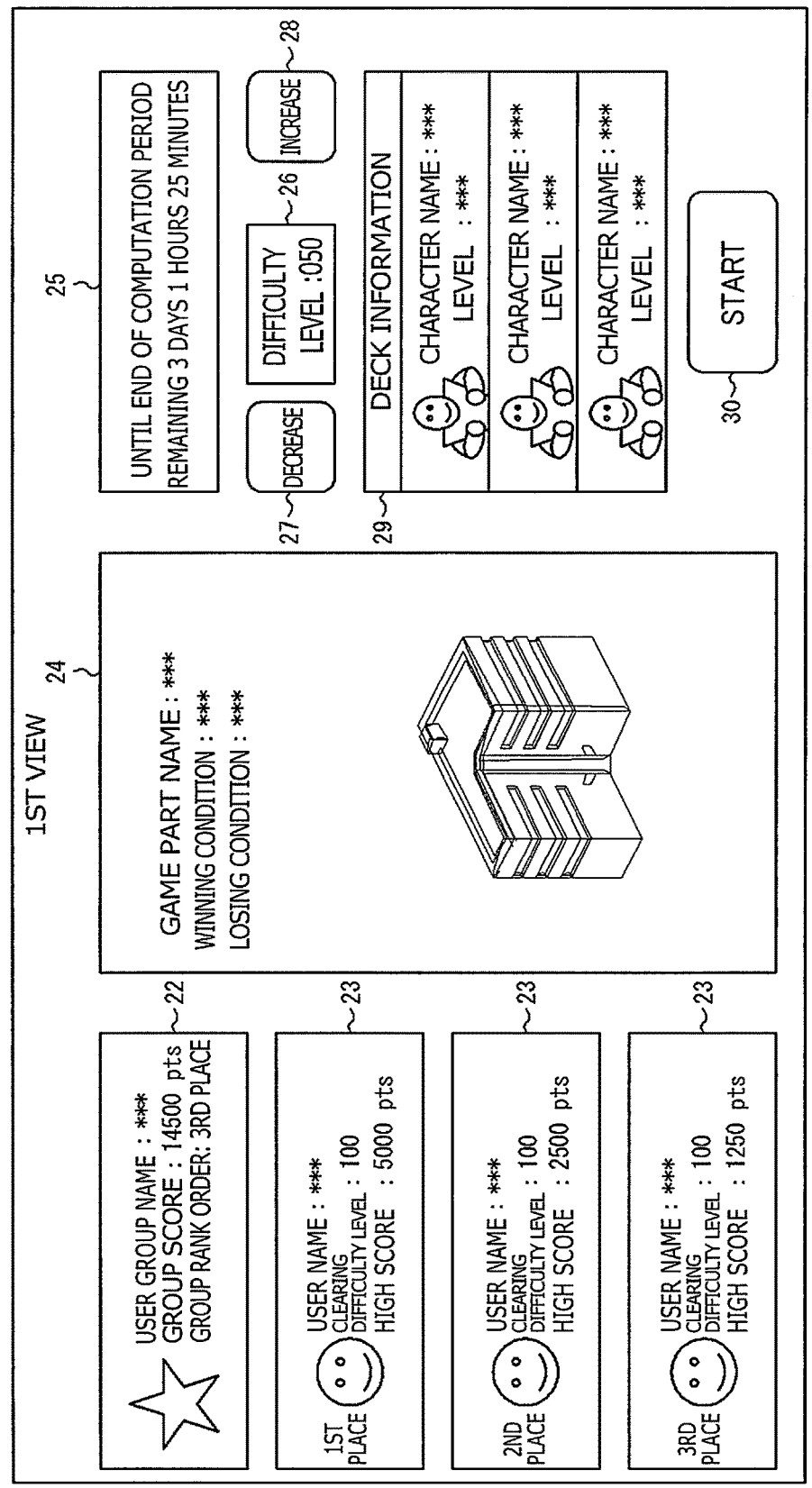
FIGS. 8 to 13 are views illustrating examples of first to sixth views each to be displayed on a terminal device.

FIG. 8 depicts an example of the first view. For example, the first view is displayed before a game part is started. The first view includes a display region 22 for group information, one or more display regions 23 for contributive user information, a display region 24 for game part information, a display region 25 for computation period, a display region 26 for difficulty level, a decrease button 27, an increase button 28, a display region 29 for deck information, and a start button 30.

In the display region 22 for group information, displayed is any information relating to the user group to which the user of the terminal device 12 belongs. In the example shown in FIG. 8, displayed are the user group name, the first point ("GROUP SCORE" in the figure), and the rank of the user group in the ranking information.

The one or more display regions 23 for contributive user information are provided each corresponding to each one of one or more contributive users corresponding to a user group (i.e., one or more users associated with the user group in the ranking information). In the display region 23, displayed is any information relating to the corresponding contributive user. In the example shown in FIG. 8, displayed are the user name, the clearing difficulty level, and the second point indicative of the best execution result of a game part ("HIGH SCORE" in the figure). The clearing difficulty level is indicative of the difficulty level of a game part at the time the corresponding contributive user cleared the game part.

The display region 23 for contributive user information may act as a GUI for receiving a user manipulation.

For example, upon reception of a user manipulation on the display region 23 for contributive user information, the terminal control circuitry 21 may transmit, to the server device 11, the information relating to the deck provided when the corresponding contributive user cleared the game part or a request for retrieving replay data. In response to the reception of the retrieving request, the server control circuitry 16 transmits the information relating to the deck or the replay data to the terminal device 12. The terminal control circuitry 21 allows the received information or data to be displayed on the display circuitry 19.

Furthermore, for example, upon reception of a user manipulation on the display region 23 for contributive user information, the terminal control circuitry 21 may automatically determine the deck of the user of the terminal device 12 on the basis of the information relating to the deck provided when the corresponding contributive user cleared the game part. More specifically, for each game content included in the deck of the contributive user corresponding to the display region 23, the terminal control circuitry 21 determines whether the user of the terminal device 12 owns a game content having the same game content name as that of the aforementioned game content. The terminal control circuitry 21 automatically determines a new deck that includes at least game content that the deck currently owns. When one or more game contents the deck does not currently own are found, the terminal control circuitry 21 may stop the automatically determining step and allow to display the information suggesting that the deck cannot be automatically determined on the display circuitry 19.

The aforementioned arrangement in which the display region 23 for contributive user information acts as a GUI for receiving a user manipulation improves the usability of games because the user of the terminal device 12 can refer to the information provided when the contributive user corresponding to the display region 23 cleared a game part.

In the display region 24 for game part information, displayed is any information relating to a game part. In the example shown in FIG. 8, displayed are the game part name, a winning condition, a losing condition, and a stage image. The winning condition is indicative of a condition for determining that the game is cleared. The losing condition is indicative of a condition for determining that the game is over. The stage image illustrates in a simplified manner, for example, the virtual space in which the game content of the user to be used and an opponent or the like are disposed.

In the display region 25 for computation period, displayed is the remaining time until the computation period is elapsed.

In the display region 26 for difficulty level, displayed is the difficulty level of a game part. The decrease button 27 is a GUI (Graphical User Interface) for receiving a user manipulation to reduce the difficulty level. The terminal control circuitry 21 reduces the difficulty level in response to a user manipulation on the decrease button 27. The increase button 28 is a GUI for receiving a user manipulation to increase the difficulty level. The terminal control circuitry 21 increases the difficulty level in response to a user manipulation on the increase button 28.

In the display region 29 for deck information, displayed is the information relating to each game content in use included in the deck being selected. In the example shown in FIG. 8, displayed are the name of each game content in use ("CHARACTER NAME" in the figure), and the level. In the presence of a plurality of decks, the terminal control circuitry 21 may switch the deck being selected to another deck in response to a user manipulation (e.g., swiping) on the display region 29.

The start button 30 is a GUI for receiving a user manipulation for transmitting a request for executing a game part to the server device 11. The terminal control circuitry 21 transmits a request for executing a game part to the server device 11 in response to a user manipulation on the start button 30.

(Second View)

Figure 9:
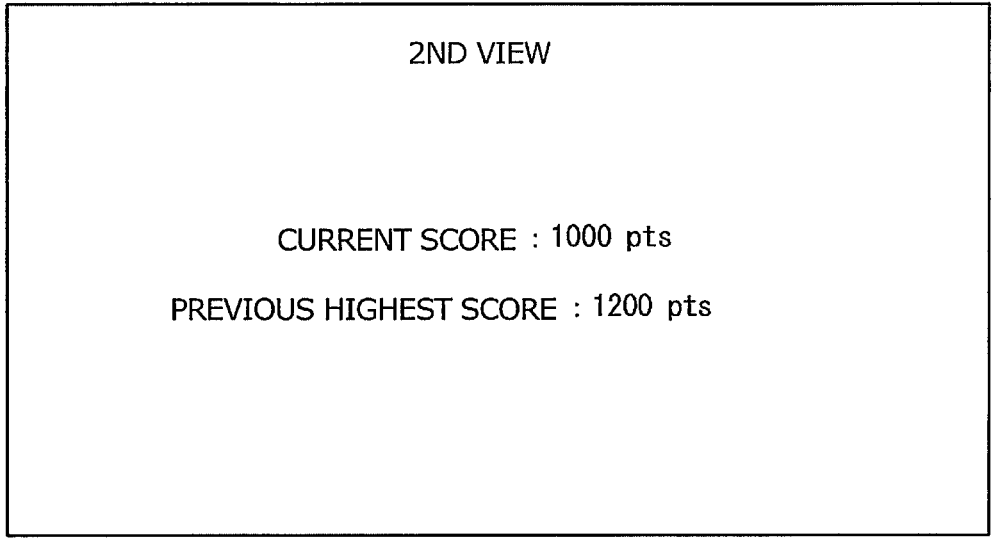

FIG. 9 depicts an example of a second view. For example, the second view is displayed when the execution result of a game part does not satisfy an update condition after the game part is ended. Displayed in the second view shown in FIG. 9 are the second point indicative of the execution result of a game part ("CURRENT SCORE" in the figure), and the second point indicative of the best execution result of game parts within a computation period ("PREVIOUS HIGHEST SCORE" in the figure). The terminal control circuitry 21 may transition the second view to the first view, for example, in response to a user manipulation on the second view.

(Third View)

Figure 10:
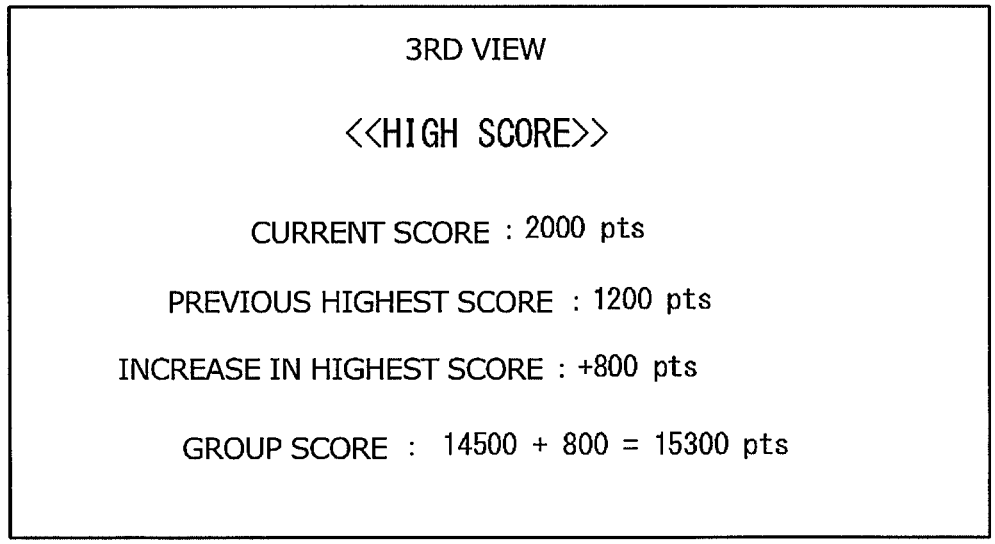

FIG. 10 depicts an example of a third view. For example, the third view is displayed when the execution result of a game part satisfies an update condition after the game part is ended. More specifically, when receiving, from the server device 11, a command for displaying the information indicating that the update condition is satisfied, the terminal control circuitry 21 allows the third view to be displayed according to the display command.

Displayed on the third view shown in FIG. 10 are the information indicating that the update condition is satisfied (the character "HIGH SCORE" in the figure), the second point indicative of the execution result of a game part ("CURRENT SCORE" in the figure), the second point indicative of the previous best execution result of the game part within the computation period ("PREVIOUS HIGHEST SCORE" in the figure), the difference between "CURRENT SCORE" and "PREVIOUS HIGHEST SCORE" ("INCREASE IN HIGHEST SCORE" in the figure), and the first point after being changed in the user group in the past ranking information ("GROUP SCORE" in the figure).

The terminal control circuitry 21 may transition the third view to another view, for example, in response to a user manipulation on the third view. For example, when the rank of the user group is changed in the past ranking information, the terminal control circuitry 21 transitions the third view to a fourth view to be discussed later. However, when the rank of the user group is not changed in the past ranking information, the terminal control circuitry 21 may transition the third view to the first view.

(Fourth View)

Figure 11:
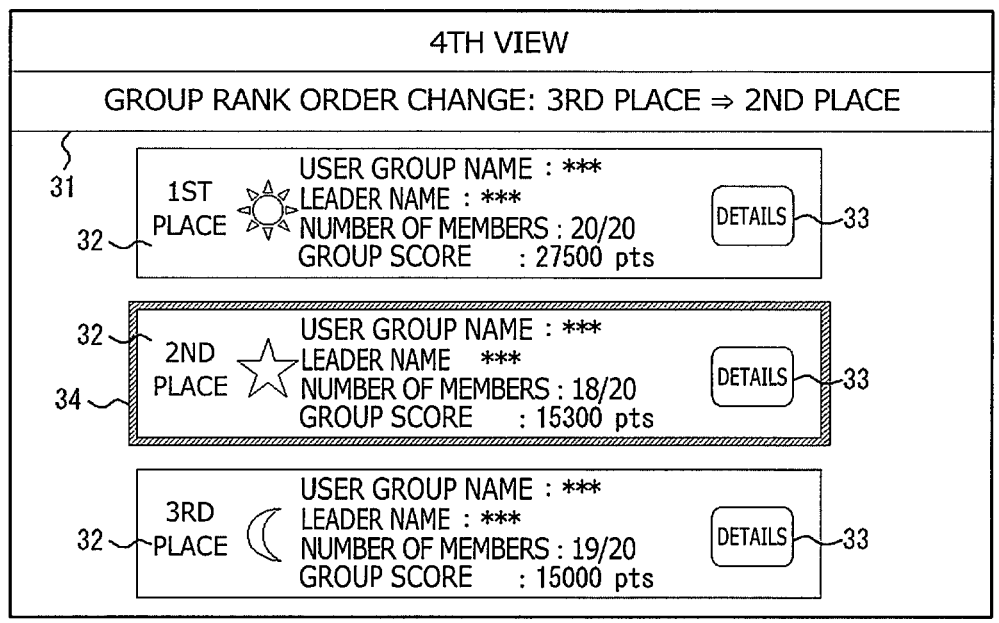

FIG. 11 depicts an example of a fourth view. For example, after the third view is displayed, the fourth view is displayed when the rank of the user group to which the user of the terminal device 12 belongs is changed in the past ranking information. More specifically, when receiving, from the server device 11, a command for displaying the information indicating that the rank of the user group is changed in the past ranking information, the terminal control circuitry 21 allows the fourth view to be displayed according to the display command. The fourth view shown in FIG. 11 includes a display region 31 for rank change, a plurality of display regions 32 for group information, and a plurality of details buttons 33.

Displayed in the display region 31 for rank change are the values before and after being changed in the rank of the user group in the past ranking information. In the example shown in FIG. 11, displayed is that the rank of the user group is changed from the third place to the second place.

The plurality of display regions 32 for group information are provided corresponding to a plurality of respective user groups in the past ranking information. In the display region 32, displayed is any information relating to the user group based on the past ranking information. In the example shown in FIG. 11, for example, displayed are the rank of the user group in the past ranking information, the user group name, the user name of the management user who belongs to the user group ("LEADER NAME" in the figure), the number of users who belong to the user group ("NUMBER OF MEMBERS" in the figure), and the first point of the user group ("GROUP SCORE" in the figure). In the fourth view, for example, the plurality of display regions 32 for group information may be displayed in descending order or in ascending order according to the rank of the user group.

The terminal control circuitry 21 may allow the display region 32 for group information corresponding to the user group to which the user of the terminal device 12 belongs to be displayed in a way different from another display region 32. The example shown in FIG. 11 includes a highlighted frame image 34 around the display region 32 corresponding to the user group to which the user of the terminal device 12 belongs. However, the display region 32 may be displayed without being limited to the way mentioned above, and may also be displayed in another display mode such as by blinking.

The terminal control circuitry 21 may change the rank to be displayed on the display region 32 corresponding to the user group to which the user of the terminal device 12 belongs from a value before being changed (e.g., the third place) to a value after being changed (e.g., the second place) and may also change positions, e.g., by animation, between the display region 32 and another display region 32 for group information.

The plurality of details buttons 33 are provided corresponding to a plurality of respective user groups in the past ranking information. The details button 33 is a GUI for receiving a user manipulation to display any information relating to a corresponding user group. The terminal control circuitry 21 allows any information relating to the corresponding user group to be displayed on the display circuitry 19 in response to a user manipulation on the details button 33. The any information relating to the user group may include, for example, one or more combinations of a user who belongs to the corresponding user group and a second point.

(Fifth View)

Figure 12:
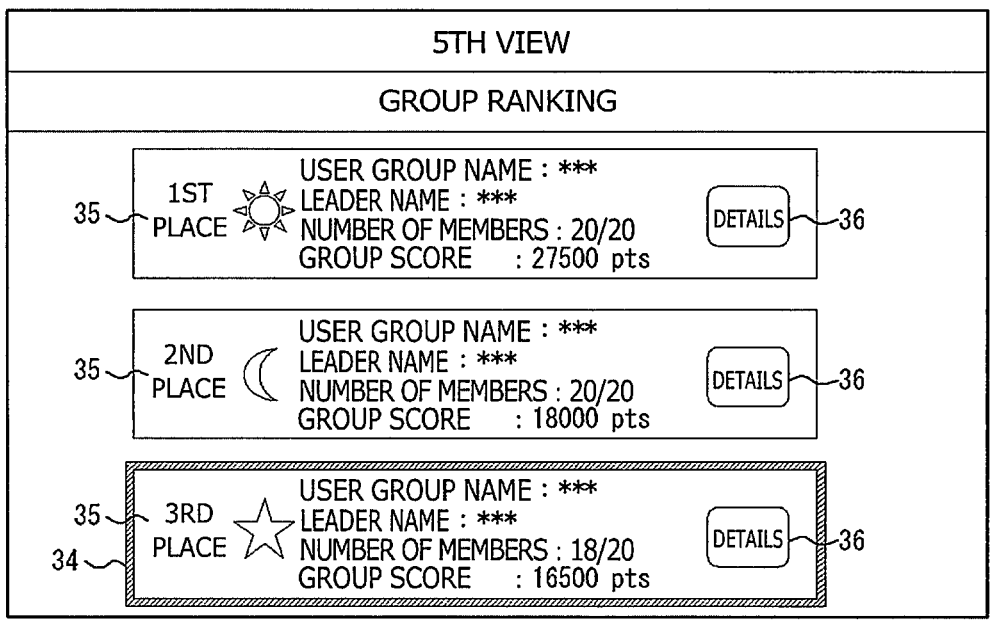

FIG. 12 depicts an example of a fifth view. The fifth view may be displayed according to a display command transmitted by the server device 11, for example, in response to a request from the terminal device 12. The fifth view shown in FIG. 12 includes a plurality of display regions 35 for group information, and a plurality of details buttons 36.

The plurality of display regions 35 for group information are provided corresponding to a plurality of respective user groups in the ranking information. In the display regions 35, displayed is any information relating to the user group based on the ranking information. In the example shown in FIG. 12, for example, displayed are the rank of the user group in the ranking information, the user group name, the user name of the management user who belongs to the user group ("LEADER NAME" in the figure), the number of users who belong to the user group ("NUMBER OF MEMBERS" in the figure), and the first point of the user group ("GROUP SCORE" in the figure).

The terminal control circuitry 21 may allow the display region 35 corresponding to the user group to which the user of the terminal device 12 belongs to be displayed in a way different from another display region 35. The example shown in FIG. 12 includes the highlighted frame image 34 displayed around the display region 35 corresponding to the user group to which the user of the terminal device 12 belongs. However, the display region 35 may be displayed without being limited to the way mentioned above, and may also be displayed in another display mode such as by blinking.

The information displayed in the display region 32 of the aforementioned fourth view is based on the past ranking information. In contrast to this, the information displayed on the display region 35 of the fifth view is based on (not the past ranking information but) the current ranking information.

The plurality of details buttons 36 are provided corresponding to a plurality of respective user groups in the ranking information. The details button 36 is a GUI for receiving a user manipulation to display any information relating to a corresponding user group. The details button 36 displayed on the fifth view may be the same as the details button 33 to be displayed on the fourth view.

(Sixth View)

Figure 13:
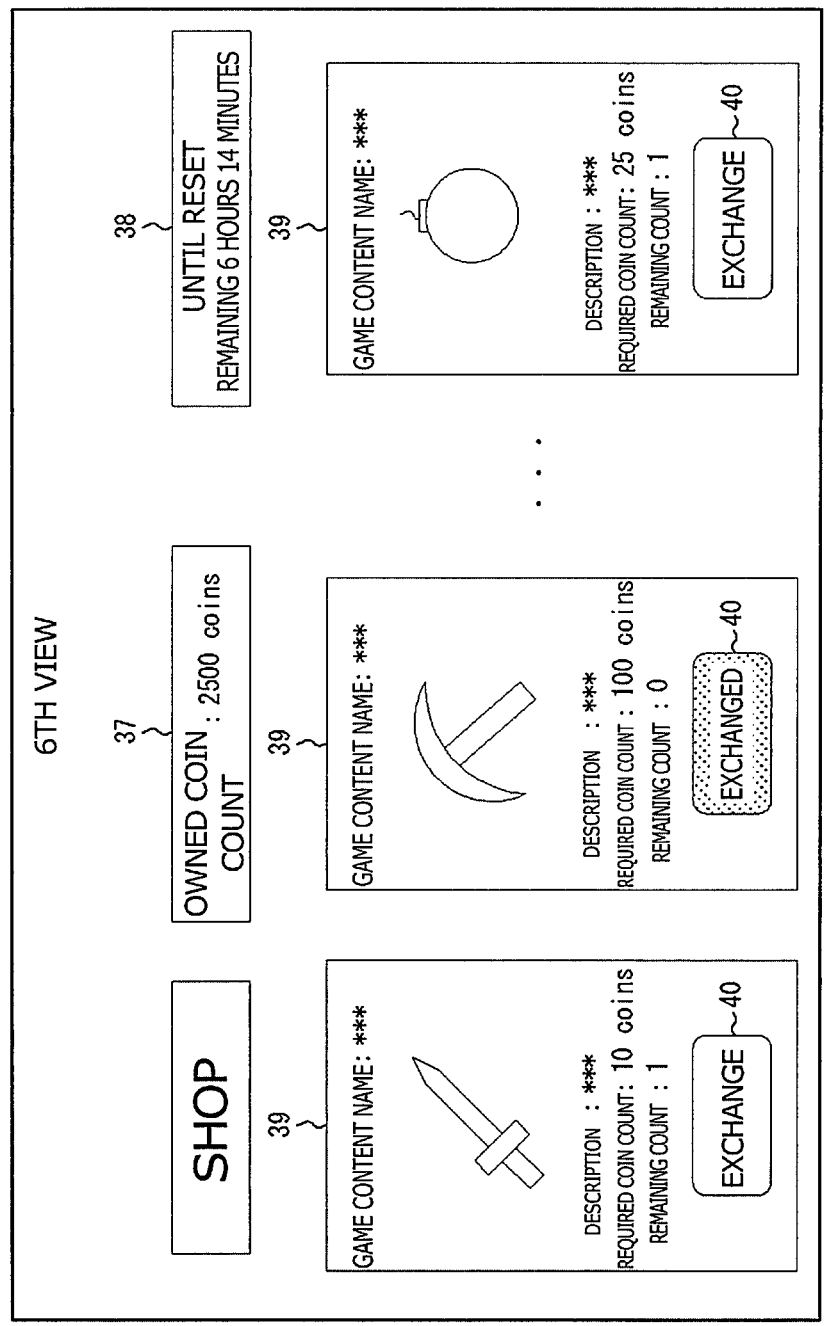

FIG. 13 depicts an example of a sixth view. The sixth view may be displayed, for example, according to a command for displaying information relating to a retrieval table corresponding to the user of the terminal device 12, the command being transmitted by the server device 11 in response to a request from the terminal device 12. The sixth view is displayed while the processing relating to the aforementioned game part "group shop" is being executed. The sixth view shown in FIG. 13 includes a display region 37 for special game content number, a display region 38 for remaining time, one or more display regions 39 for acquired game content, and one or more exchange buttons 40.

The display region 37 for special game content number displays the number of special game contents associated with the user ("OWNED COIN COUNT" in the figure).

The display region 38 for remaining time displays the remaining time until the processing for selecting one pattern included in the provision table as described above and the processing for storing the retrieval table of the user are executed next ("UNTIL RESET" in the figure).

The one or more display regions 39 for acquired game content are provided corresponding to one or more respective combinations of a game content and the remaining count thereof included in the retrieval table of the user. The display region 39 displays any information relating to the corresponding game content. In the example shown in FIG. 13, displayed are the name of the game content, the image indicative of the game content, the description of the game content, the number of special game contents required to acquire the game content ("REQUIRED COIN COUNT" in the figure), and the remaining count included in the retrieval table.

The one or more exchange buttons 40 are provided corresponding to the one or more respective display regions 39 for acquired game content. The exchange button 40 is a GUI for receiving a user manipulation to transmit, to the server device 11, a request for retrieving the game content illustrated in the corresponding display region 39. The terminal control circuitry 21 transmits, to the server device 11, the request for retrieving the game content in response to a user manipulation on the exchange button 40.

The terminal control circuitry 21 may stop receiving a user manipulation on the exchange button 40 when the remaining count illustrated in the display region 39 corresponding to the exchange button 40 is zero. In such a case, the terminal control circuitry 21 may display the exchange button 40 in a way different from the normal one (e.g., grayed out, etc.), or alternatively may also not display the exchange button 40.

Figure 14:
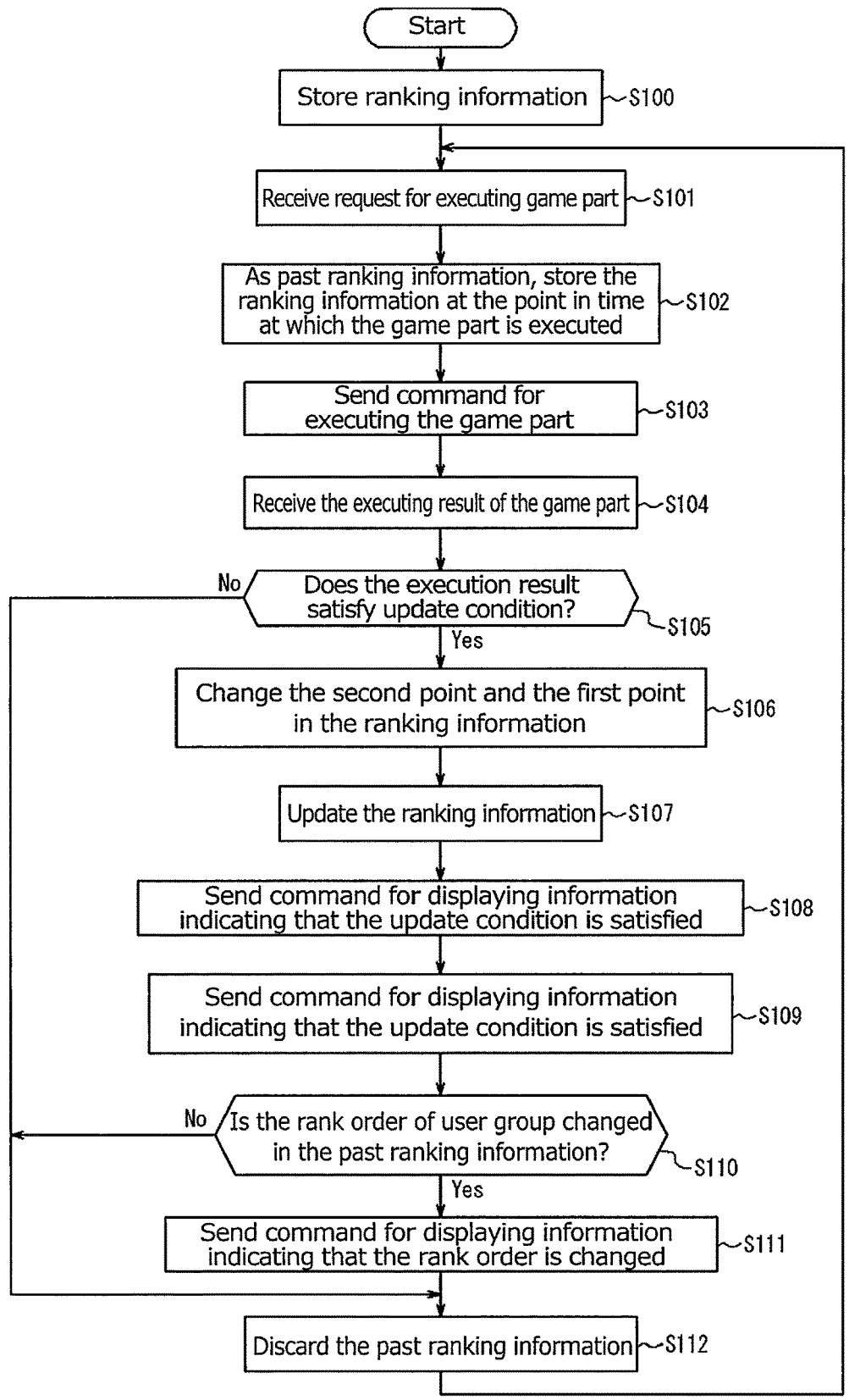
FIGS. 14 to 17 are flowcharts indicative of first to fourth operations of a server device, respectively.

Referring to FIG. 14, description will be made with regard to the first operation of the server device 11. The first operation includes the operation of the server device 11 to execute the aforementioned processing relating to a game part.

Step S100: the server control circuitry 16 stores the ranking information in the server storage circuitry 15.

Step S101: the server control circuitry 16 receives a request for executing a game part from the terminal device 12.

Step S102: the server control circuitry 16 employs the ranking information at the point in time at which the game part is executed by the terminal device 12 as the past ranking information, and then stores the resulting information in association with the user of the terminal device 12.

Step S103: the server control circuitry 16 transmits a command for executing the game part to the terminal device 12.

Step S104: the server control circuitry 16 receives the execution result of the game part from the terminal device 12.

Step S105: the server control circuitry 16 determines whether the received execution result satisfies the update condition. If the update condition is determined to be satisfied (step S105—Yes), the process proceeds to step S106. However, when it is determined that the update condition is not satisfied (step S105—No), the process proceeds to step S112.

Step S106: the server control circuitry 16 changes each of the second point of the user and the first point of the user group in the ranking information stored in step S100.

Step S107: the server control circuitry 16 updates the ranking information stored in step S100. More specifically, the server control circuitry 16 updates the rank of each user group on the basis of the first point of each user group in the ranking information.

Step S108: the server control circuitry 16 transmits, to the terminal device 12, a command for displaying the information indicating that the update condition is satisfied.

Step S109: the server control circuitry 16 changes each of the second point of the user and the first point of the user group in the past ranking information stored in step S102.

Step S110: the server control circuitry 16 determines whether the rank of the user group in the stored past ranking information is changed on the basis of the first point after being changed. If it is determined that the rank is changed (step S110—Yes), then the process proceeds to step S111. However, when it is determined that the rank is not changed (step S110—No), the process proceeds to step S111.

Step S111: the server control circuitry 16 transmits, to the terminal device 12, a command for displaying the information indicating that the rank of the user group in the past ranking information is changed.

Step S112: the server control circuitry 16 discards the past ranking information stored in step S102. Subsequently, the process returns to step S101.

Figure 15:
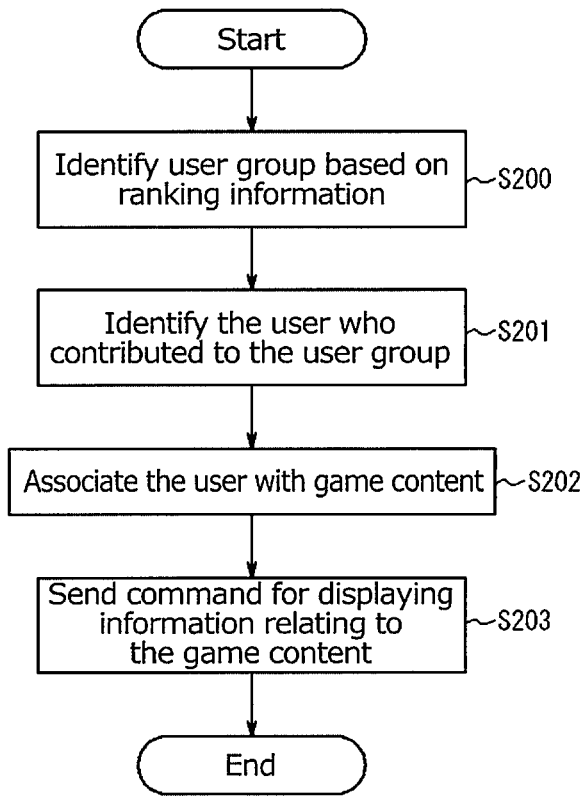

Referring to FIG. 15, description will be made with regard to the second operation of the server device 11. The second operation includes the operation of the server device 11 to execute the aforementioned processing relating to a reward.

Step S200: when the computation period of a game part is ended, the server control circuitry 16 identifies, according to the ranking information, one or more user groups of a plurality of user groups indicated in the ranking information. For example, the server control circuitry 16 may identify a certain number of user groups from the top according to the rank indicated in the ranking information.

Step S201: the server control circuitry 16 identifies the user who contributes to the ranking of each user group identified in step S200. More specifically, in the ranking information, the server control circuitry 16 identifies each user associated with each identified user group.

Step S202: the server control circuitry 16 gives each user identified in step S201 a game content as a reward.

Step S203: the server control circuitry 16 transmits, to the terminal device 12 of each user, a command for displaying any information relating to a game content (e.g., the name and the count of the game content, etc.), the user being associated with the game content in step S202. Then, the second operation is ended.

Figure 16:
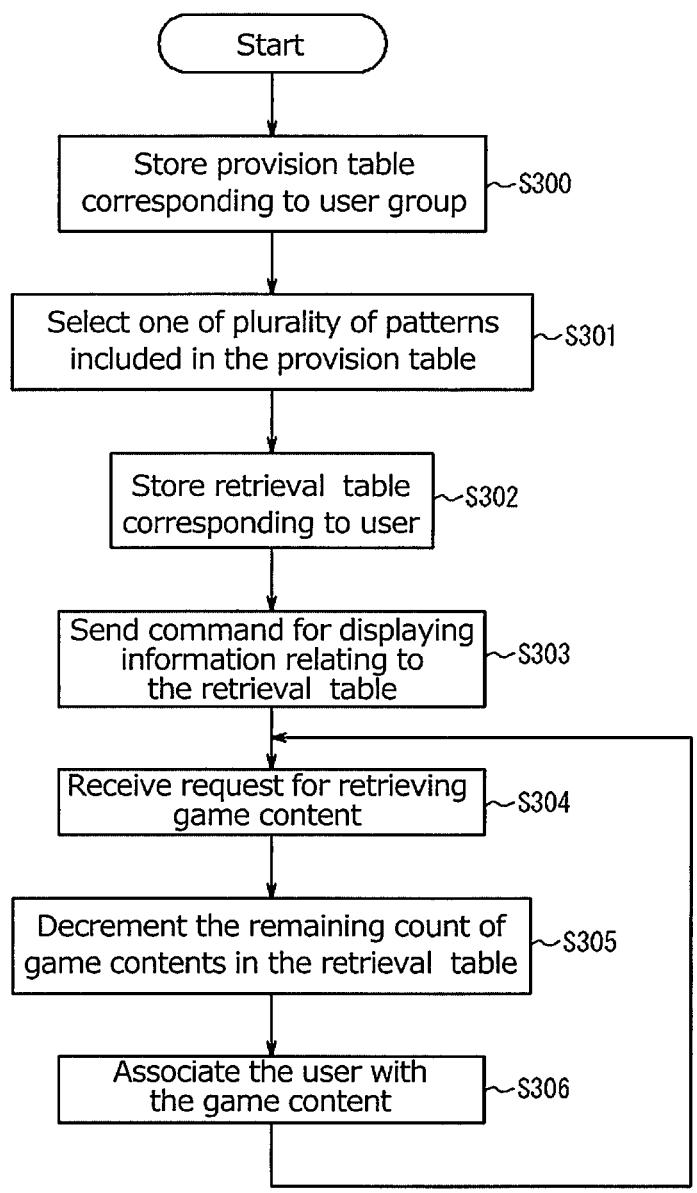

Referring to FIG. 16, description will be made with regard to the third operation of the server device 11. The third operation includes the operation of the server device 11 to execute the aforementioned processing relating to the group shop.

Step S300: the server control circuitry 16 stores, in the server storage circuitry 15, for each user group, the provision table corresponding to a user group.

Step S301: the server control circuitry 16 selects, for each user group, any one of a plurality of patterns included in the provision table.

Step S302: the server control circuitry 16 stores, in the server storage circuitry 15, for each user, the retrieval table corresponding to the user according to the selected one pattern included in the provision table of the user group to which the user belongs.

Step S303: for example, in response to a request from the terminal device 12 of the user, the server control circuitry 16 transmits, to the terminal device 12, a command for displaying the information relating to the retrieval table corresponding to the user.

Step S304: the server control circuitry 16 receives, from the terminal device 12 in step S303, a request for retrieving the game content indicated in the retrieval table.

Step S305: in the retrieval table corresponding to the user in step S303, the server control circuitry 16 decrements the remaining count of game contents relating to the retrieving request in step S303.

Step S306: the server control circuitry 16 associates the game content relating to the retrieving request in step S303 with the user in step S303. Then, the process returns to step S304.

Figure 17:
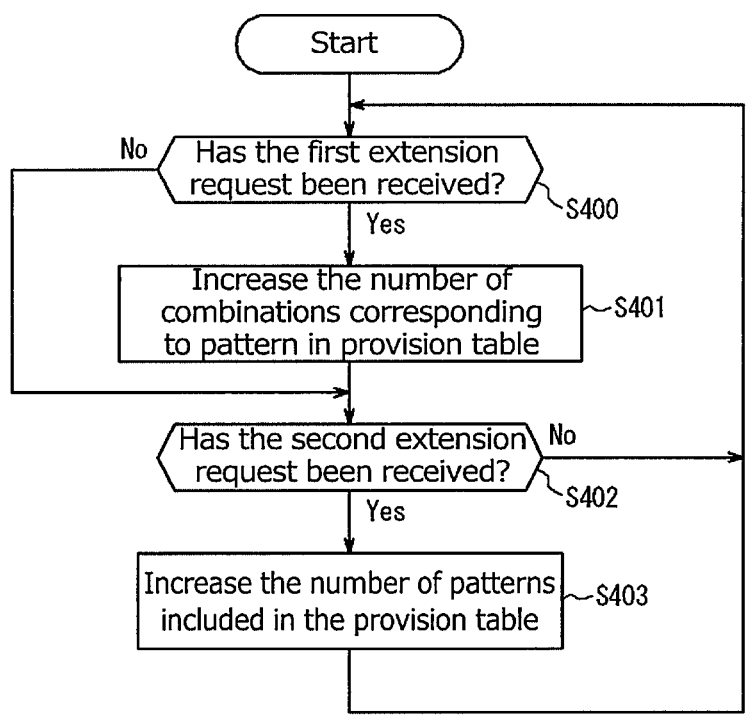

Referring to FIG. 17, description will be made with regard to the fourth operation of the server device 11. The fourth operation includes the operation of the server device 11 for executing the aforementioned processing to extend the provision table.

Step S400: the server control circuitry 16 determines whether the first extension request for the provision table corresponding to the user group to which the user belongs was received from the terminal device 12 of the user. If it is determined that the first extension request was received (step S400—Yes), then the process proceeds to step S401. However, when it is determined that the first extension request was not received (step S400—No), the process proceeds to step S402.

Step S401: in the provision table in step S400, the server control circuitry 16 increases the number of combinations of a game contents and the count thereof corresponding to one or more respective patterns. In such a case, for example, in the provision table shown in FIG. 6, "the ninth column" may be added.

Step S402: the server control circuitry 16 determines whether the second extension request for the provision table corresponding to the user group to which the user belongs was received from the terminal device 12 of the user. If it is determined that the second extension request was received (step S402—Yes), then the process proceeds to step S403. However, when the second extension request was not received (step S402—No), the process returns to step S400.

Step S403: the server control circuitry 16 increases the number of patterns included in the provision table in step S402. In such a case, for example, in the provision table shown in FIG. 6, the row of pattern "9" may be additionally provided.

As described above, according to the disclosure of this embodiment, when the execution result of a game part executed by the terminal device 12 of the user satisfies an update condition, the first point in the ranking information corresponding to the user group to which the user belongs is changed. The server device 11 updates the ranking information on the basis of the first point after being changed. According to such an arrangement, it is not always necessary for the user of the terminal device 12 to play a multi-play game part in order to contribute to the ranking of the user group to which the user belongs. Thus, for example, even a user who prefers a single play to a multi-play may readily contribute to the ranking of the user group. It is thus recommended to form the cooperative relationship among users who belong to the same user group.

Furthermore, according to the disclosure of this embodiment, when the execution result of the game part by the terminal device 12 satisfies an update condition, the information indicating that the update condition is satisfied is displayed on the terminal device 12. Here, as described above, when the update condition is satisfied, the first point of the user group to which the user belongs is changed. Thus, according to such an arrangement, the user of the terminal device 12 can visually recognize that the user contributed to the ranking of the user group, to which the user belongs, by playing the game part.

Furthermore, according to the disclosure of this embodiment, at least part of the ranking information at the point of time at which the game part is executed by the terminal device 12 is stored as the past ranking information. When the execution result of the game part by the terminal device 12 satisfies an update condition, the first point in the past ranking information corresponding to the user group to which the user of the terminal device 12 belongs is changed. When the rank of the user group determined on the basis of the first point after being changed in the past ranking information is changed in the stored past ranking information, the information indicating that the rank of the user group is changed is displayed on the terminal device 12. According to such an arrangement, as will be described below, the user who played the game part readily realizes to have contributed to the ranking of the user group. It is thus possible to improve user's satisfaction.

For example, suppose that at the point of time at which a game part is executed by the terminal device 12 of a user A who belongs to a user group A, the rank of the user group A in the ranking information is tenth, for example. At this time, the rank of the user group A in the past ranking information stored in association with the user A is also tenth. Also suppose that, subsequently, the execution of a game part by the terminal device 12 of a user B who belongs to a user group B is ended during the execution of the game part by the terminal device 12 of the user A, and for example, the rank of the user group A in the ranking information is changed from the tenth to the eleventh. Even in that case, the rank of the user group A in the past ranking information stored in association with the user A is unchanged from the tenth place.

Here, consider a case where the game part executed by the terminal device 12 of the user A is ended, and the execution result of the game part satisfies an update condition. In such a case, for example, an increase in the second point of the user A will cause an increase in the first point of the user group A. Thus, by playing the game part, the user A contributes to the increase in the first point of the user group A.

However, assume an arrangement in which the rank of the user group A based (not on the past ranking information but) on the ranking information after the execution of the game part by the terminal device 12 of the user B is ended is displayed on the terminal device 12 of the user A. In this arrangement, displayed is the information indicating that the rank of the user group A is changed, i.e., that the rank of the user group A is lowered from the tenth place to the eleventh place. Thus, although the user A actually contributes to an increase in the first point of the user group A, the user A hardly realize his/her contribution.

In contrast to this, according to the disclosure of this embodiment, the information indicating that the rank of the user group A is changed in accordance with the past ranking information is displayed on the terminal device 12 of the user A. For example, it may be displayed that the rank of the user group A is changed to a place higher than the tenth place. Thus, the user A easily realize that the user A successfully contributed to an increase in the first point of the user group A. Thus, the user's satisfaction may be improved.

In the disclosure of this embodiment, update conditions may include a condition that the second point indicative of the execution result of the game part executed by the terminal device 12 is the maximum or minimum among the execution results of game parts executed by the terminal device 12 within the computation period. According to such an arrangement, the best execution result within the computation period among the execution results of the game parts played by the user is reflected on the ranking of the user groups. Thus, for example, even such a user who is unskilled in games can contribute to the ranking of the user group irrespective of the execution results of the game parts by other users, thus improving the user's satisfaction to games.

Although description has been made to the present disclosure according to the drawings and embodiments, note that those skilled in the art may readily make a variety of modifications and amendments in accordance with the disclosure. It should be thus understood that these modifications and amendments are included in the scope of the present disclosure. For example, the function, etc. included in each means and each step, etc. can be relocated without logical contradictions, and a plurality of means or steps, etc. may be combined into one or divided.

For example, in the embodiment mentioned above, such an arrangement may be employed in which part or all of the operations and processing executed by the server device 11 are executed by the terminal device 12. Likewise, such an arrangement may be employed in which part of the operations executed by the terminal device 12 is executed by the server device 11. For example, the processing for, such as, display control of various views displayed on the terminal device 12 and control of various GUIs may be executed by either one of the server device 11 and the terminal device 12, or may be executed by the server device 11 and the terminal device 12 in collaboration with each other. Alternatively, the game system 10 may not include the server device 11. In such a case, the terminal device 12 may store in advance the information received from the server device 11 in the aforementioned embodiments.

In the aforementioned embodiment, description was made to the arrangement in which the ranking information is stored for each combination of one set ID and one game part ID. However, for example, it may also be acceptable that the ranking information is stored for each combination of one set ID and a plurality of game part IDs. In such a case, the second point of the user that may be included in the ranking information may be a total value of the second points indicative of the respective execution results of the plurality of game parts executed by the terminal device 12 of the user. According to such an arrangement, the user needs to aim at the best execution result in each of the plurality of game parts in order to contribute to the ranking of the user group to which the user belongs. This improves the interest of games.

For example, in the aforementioned arrangement in which the ranking information is stored for each combination of one set ID and a plurality of game part IDs, the upper limit number of game parts that each user can play may be provided. More specifically, it is acceptable that the ranking information is stored for each combination of one set ID and eight game part IDs, with each user allowed to play two game parts at the maximum. According to such an arrangement, each member of the user group needs to strategically consider which one of the plurality of game parts should be played. Thus, in the user group, it is further recommended to form the cooperative relationship among members.

Figure 18:
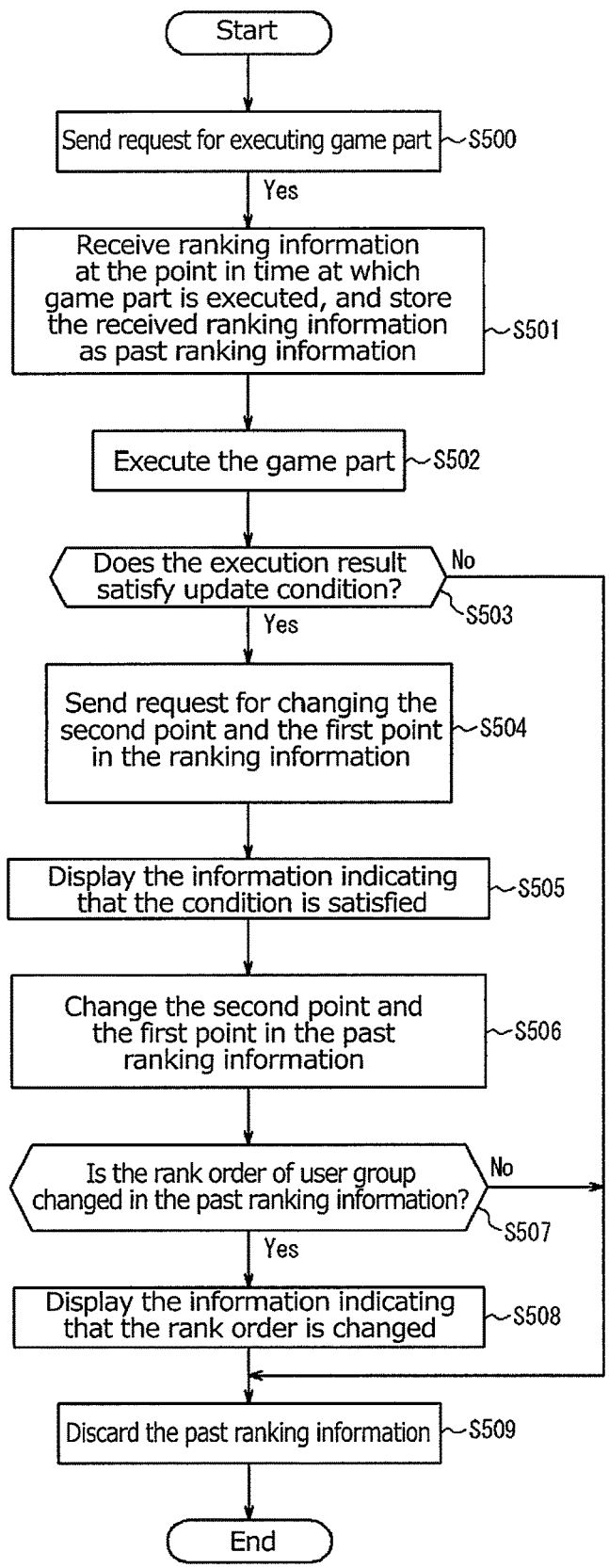
FIG. 18 is a flowchart showing the operation of a terminal device according to another embodiment.

Furthermore, in the aforementioned embodiment, description was made to such an arrangement in which the server device 11 stores the past ranking information in association with the user of the terminal device 12, however, an arrangement may also be employed in which the terminal device 12 stores the past ranking information. Referring to FIG. 18, description will be made with regard to an example of an operation executed by the terminal device 12 of such an arrangement. The operation includes an operation of the terminal device 12 for executing the aforementioned processing relating to a game part.

Step S500: the terminal control circuitry 21 transmits a request for executing a game part to the server device 11.

Step S501: the terminal control circuitry 21 receives a command for executing the game part from the server device 11. For example, the command for executing the game part includes the ranking information at the point of time at which the game part is executed by the terminal device 12. The terminal control circuitry 21 stores the received ranking information in the terminal storage circuitry 18 as the past ranking information.

Step S502: the terminal control circuitry 21 executes the game part in response to the command for execution of the game part received in step S501.

Step S503: when having determined the execution result of the game part, the terminal control circuitry 21 determines whether the execution result satisfies an update condition. If the update condition is determined to be satisfied (step S503—Yes), then the process proceeds to step S504. However, when it is determined that the update condition is not satisfied (step S503—No), for example, the terminal control circuitry 21 allows the aforementioned second view to be displayed on the display circuitry 19. Then, the process proceeds to step S509.

Step S504: the terminal control circuitry 21 transmits, to the server device 11, a request for changing each of the second point of the user and the first point of the user group in the ranking information stored in the server device 11.

Step S505: the terminal control circuitry 21 allows the information indicating that the update condition is satisfied to be displayed, for example, in the aforementioned third view on the display circuitry 19.

Step S506: the terminal control circuitry 21 changes each of the second point of the user and the first point of the user group in the past ranking information received in step S501.

Step S507: the terminal control circuitry 21 determines whether the rank of the user group determined on the basis of the first point after being changed in the past ranking information is changed from the rank of the user group in the stored past ranking information. If it is determined that the rank is changed (step S507—Yes), then the process proceeds to step S508. However, when it is determined that the rank is not changed (step S507—No), the process proceeds to step S509.

Step S508: the terminal control circuitry 21 allows the information indicating that the rank of the user group in the past ranking information is changed to be displayed, for example, in the aforementioned fourth view on the display circuitry 19.

Step S509: the terminal control circuitry 21 discards the past ranking information received and stored in step S501. Then, the operation is ended.

In the aforementioned embodiment, it is acceptable that at least part of the view to be displayed on the terminal device 12 is displayed by a web application on the terminal device 12 on the basis of the data generated by the server device 11, and at least part of the view is displayed by a native application installed in the terminal device 12. As described above, the game according to the aforementioned embodiment can also be made as a hybrid game, part of the processing of which can be carried out by each of the server device 11 and the terminal device 12.

Furthermore, an information processing device such as a computer or mobile phone can be preferably used to function as the server device 11 or the terminal device 12 according to the aforementioned embodiment. Such an information processing device can be implemented by storing, in storage circuitry of the information processing device, a program stating the content of the processing for implementing each function of the server device 11 or the terminal device 12 according to the embodiment, and then by reading and executing the program by a CPU of the information processing device.

The invention claimed is:

1. A method for a server device configured to communicate with a plurality of terminal devices and configured to store first ranking information for a predetermined period that includes a plurality of first points, a first point of the plurality of first points corresponding to a first user group of a plurality of user groups to each of which one or more users belong, the first ranking information also including a rank of the first user group determined based on the first point, and information that indicates contributive users associated with the first user group, the first user group being a group to which a first user of a first terminal device among the plurality of terminal devices belongs, each contributive user belonging to the first user group for at least a part of the predetermined period and contributing to obtaining the first point for the part, the method comprising:
receiving an execution result of a game part executed by the first terminal device from the first terminal device within the predetermined period;
in response to the execution result of the game part executed by the first terminal device satisfying a first condition, changing the first point corresponding to the first user group;
updating the first ranking information by updating the rank of the first user group based on the first point after being changed in the first ranking information;
associating the first user with the first user group as the contributive user; and
in response to the first user leaving the first user group, disassociating the first user from the first user group.

2. The method according to claim 1, wherein
in response to the first user leaving the first user group, the disassociating disassociates the first user from the first user group, while maintaining the first user as the contributive user in the first user group.

3. The method according to claim 1, wherein
in response to the first user leaving the first user group, the disassociating disassociates the first user from the first user group, and removes the first user as the contributive user in the first user group.

4. The method according to claim 1, wherein
in response to the first user leaving the first user group, the disassociating disassociates the first user from the first user group, removes the first user as the contributive user in the first user group, and updates the first ranking information by decreasing a value of the first point corresponding to the first user group by a value of a second point, which corresponds to the first user and was previously acquired by the first user.

5. The method according to claim 1, further comprising:
identifying one or more user groups of the plurality of user groups based on the first ranking information.

6. The method according to claim 1, further comprising:
identifying a user who belongs to a user group of the plurality of user groups based on the first ranking information.

7. The method according to claim 1, further comprising:
in response to receiving a request for executing the game part from the first terminal device, copying at least part of the first ranking information.

8. The method according to claim 1, wherein the changing changes the first point corresponding to the first user group, in response to the execution result of the game part executed by the first terminal device satisfying the first condition and the first user of the first terminal device not belonging to any other user group.

9. The method according to claim 1, wherein the first condition includes a condition that a second point indicative of the execution result is a maximum or a minimum among execution results of game parts executed by the first terminal device within the predetermined period.

10. The method according to claim 1, wherein
the first condition includes a condition that the execution result of the game part is received within the predetermined period.

11. The method according to claim 1, further comprising:
in response to the execution result of the game part satisfying the first condition, transmitting information to the first terminal device for display, the information indicating that the first condition is satisfied.

12. The method according to claim 9, further comprising:
in response to the execution result satisfying the first condition, displaying, on the first terminal device, the information indicating that the first condition is satisfied.

13. The method according to claim 1, further comprising:
in response to the first user being associated in the first ranking information with a second user group different from the first user group and the second user group satisfying a second condition in the first ranking information, associating the first user with a reward.

14. A system comprising:
a server device configured to communicate with a plurality of terminal devices and configured to store first ranking information for a predetermined period that includes a plurality of first points, a first point of the plurality of first points corresponding to a first user group of a plurality of user groups to each of which one or more users belong, the first ranking information also including a rank of the first user group determined based on the first point, and information that indicates contributive users associated with the first user group, the first user group being a group to which a first user of a first terminal device among the plurality of terminal devices belongs, each contributive user belonging to the first user group for at least a part of the predetermined period and contributing to obtaining the first point for the part, the server device including processing circuitry configured to
receive an execution result of a game part executed by the first terminal device from the first terminal device within the predetermined period,
in response to the execution result of the game part executed by the first terminal device satisfying a first condition, change the first point corresponding to the first user group,
update the first ranking information by updating the rank of the first user group based on the first point after being changed in the first ranking information,
associate the first user with the first user group as the contributive user, and
in response to the first user leaving the first user group, disassociate the first user from the first user group.

15. The system according to claim 14, wherein the processing circuitry is configured to, in response to the first user leaving the first user group, disassociate the first user from the first user group, while maintaining the first user as the contributive user in the first user group.

16. The system according to claim 14, wherein the processing circuitry is configured to, in response to the first user leaving the first user group, disassociate the first user from the first user group, and remove the first user as the contributive user in the first user group.

17. The system according to claim 14, wherein the processing circuitry is configured to, in response to the first user leaving the first user group, disassociate the first user from the first user group, removes the first user as the contributive user in the first user group, and update the first ranking information by decreasing a value of the first point corresponding to the first user group by a value of a second point, which corresponds to the first user and was previously acquired by the first user.

18. The system according to claim 14, wherein the processing circuitry is further configured to identify one or more user groups of the plurality of user groups based on the first ranking information.

19. The system according to claim 14, wherein the processing circuitry is further configured to identifying a user who belongs to a user group of the plurality of user groups based on the first ranking information.

20. The system according to claim 14, wherein the processing circuitry is further configured to, in response to receiving a request for executing the game part from the first terminal device, copy at least part of the first ranking information.

* * * * *